United States Patent
Fury et al.

(10) Patent No.: US 12,473,364 B2
(45) Date of Patent: Nov. 18, 2025

(54) INTRALESIONAL ADMINISTRATION OF PD-1 INHIBITORS FOR TREATING SKIN CANCER

(71) Applicant: Regeneron Pharmaceuticals, Inc., Tarrytown, NY (US)

(72) Inventors: Matthew G. Fury, New York, NY (US); Israel Lowy, Dobbs Ferry, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 941 days.

(21) Appl. No.: 17/292,179

(22) PCT Filed: Nov. 13, 2019

(86) PCT No.: PCT/US2019/061212
§ 371 (c)(1),
(2) Date: May 7, 2021

(87) PCT Pub. No.: WO2020/102375
PCT Pub. Date: May 22, 2020

(65) Prior Publication Data
US 2021/0388091 A1  Dec. 16, 2021

Related U.S. Application Data

(60) Provisional application No. 62/767,218, filed on Nov. 14, 2018.

(51) Int. Cl.
| *A61K 39/395* | (2006.01) |
| *A61K 9/00* | (2006.01) |
| *A61K 9/08* | (2006.01) |
| *C07K 16/28* | (2006.01) |

(52) U.S. Cl.
CPC ........ *C07K 16/2827* (2013.01); *A61K 9/0019* (2013.01); *A61K 9/08* (2013.01); *C07K 16/2818* (2013.01); *C07K 2317/51* (2013.01); *C07K 2317/515* (2013.01); *C07K 2317/56* (2013.01); *C07K 2317/565* (2013.01)

(58) Field of Classification Search
CPC ............ A61K 9/0019; A61K 2039/505; A61K 2039/54
See application file for complete search history.

(56) References Cited

U.S. PATENT DOCUMENTS

| 6,808,710 | B1 | 10/2004 | Wood et al. |
| 7,488,802 | B2 | 2/2009 | Collins et al. |
| 7,943,743 | B2 | 5/2011 | Korman et al. |
| 8,008,449 | B2 | 8/2011 | Korman et al. |
| 8,168,757 | B2 | 5/2012 | Finnefrock et al. |
| 8,217,149 | B2 | 7/2012 | Irving et al. |
| 8,354,509 | B2 | 1/2013 | Carven et al. |
| 8,609,089 | B2 | 12/2013 | Langermann et al. |
| 8,686,119 | B2 | 4/2014 | Rotem-Yehudar et al. |
| 8,779,105 | B2 | 7/2014 | Korman et al. |
| 8,900,587 | B2 | 12/2014 | Carven et al. |
| 9,308,236 | B2 | 4/2016 | Miller et al. |
| 9,402,899 | B2 | 8/2016 | Honjo et al. |
| 9,624,298 | B2 | 4/2017 | Nastri et al. |
| 9,938,345 | B2 | 4/2018 | Papadopoulos et al. |
| 9,987,500 | B2 | 6/2018 | Papadopoulos et al. |
| 10,011,656 | B2 | 7/2018 | Freeman et al. |
| 2013/0247234 | A1 | 9/2013 | McWhirter et al. |
| 2015/0203579 | A1 | 7/2015 | Papadopoulos et al. |
| 2017/0044259 | A1 | 2/2017 | Tipton et al. |
| 2017/0174779 | A1 | 6/2017 | Varghese et al. |
| 2017/0290808 | A1 | 10/2017 | Charo et al. |
| 2017/0327567 | A1 | 11/2017 | Skokos et al. |
| 2018/0185668 | A1 | 7/2018 | Papadopoulos et al. |
| 2018/0243413 | A1 | 8/2018 | Cohen |
| 2018/0371093 | A1 | 12/2018 | Bilic et al. |
| 2019/0040137 | A1 | 2/2019 | Hu et al. |

FOREIGN PATENT DOCUMENTS

| EP | 1591527 A1 | 11/2005 |
| EP | 3177649 A1 | 6/2017 |
| JP | 2006-340714 A | 12/2006 |
| WO | 2004056875 A1 | 7/2004 |
| WO | 2006121168 A1 | 11/2006 |
| WO | 2007005874 A2 | 1/2007 |
| WO | 2009030285 A1 | 3/2009 |

(Continued)

OTHER PUBLICATIONS

Veness et al, Cancer 106:2389-2396, 2006.*
Sarduy et al, Br J Cancer 112:1636-1643, 2015.*
Clinical trial NCT 02760498, posted May 3, 2016.*
Aguirre et al., "Immune Checkpoint Inhibitors and the Risk of Allograft Rejection: A Comprehensive Analysis on an Emerging Issue", The Oncologist (Nov. 2018), 24:394-401.
Alam et al., "Cutaneous squamous-cell carcinoma", New Engl. J. Med. (2001), 344:975-83.
Anonymous, "Definition of cemiplimab-rwlc—NCI Drug Dictionary—National Cancer Institute" (Oct. 23, 2018), XP055668903 retrieved from the internet: URL: https://web-archive.org/web/20181023154256/ https://www.cancer.gov./publications/dictionaries/cancer-drug/def/ anti-pd-1-monoclonal-antibody-regn2810?redirect=true (retrieved on Feb. 14, 2020).

(Continued)

*Primary Examiner* — Mark Halvorson
(74) *Attorney, Agent, or Firm* — Fox Rothschild LLP; Aparna G. Patankar

(57) ABSTRACT

The disclosure relates to methods for treating or inhibiting the growth of a tumor, wherein the methods include selecting a subject with a skin cancer and intralesionally administering to the tumor of the subject in need thereof a therapeutically effective amount of a programmed death 1 (PD-1) inhibitor (e.g., an antibody or antigen-binding fragment thereof that specifically binds PD-1, PD-L1, and/or PD-L2). In certain embodiments, the skin cancer is cutaneous squamous cell carcinoma. In certain embodiments, the PD-1 inhibitor is administered into multiple locations of the tumor lesion.

31 Claims, 3 Drawing Sheets
Specification includes a Sequence Listing.

(56) References Cited

FOREIGN PATENT DOCUMENTS

| | | | |
|---|---|---|---|
| WO | 2009114335 | A2 | 9/2009 |
| WO | 2010077634 | A1 | 7/2010 |
| WO | 2011110621 | A1 | 9/2011 |
| WO | 2011159877 | A2 | 12/2011 |
| WO | 2013181452 | A1 | 12/2013 |
| WO | 2013181634 | A2 | 12/2013 |
| WO | 2015112800 | A1 | 7/2015 |
| WO | 2015193352 | A1 | 12/2015 |
| WO | 2016/149201 | A2 | 9/2016 |
| WO | 2016181634 | A1 | 11/2016 |
| WO | 2017034916 | A1 | 3/2017 |
| WO | 2017040790 | A1 | 3/2017 |
| WO | 2017123981 | A1 | 7/2017 |
| WO | 2017197263 | A1 | 11/2017 |
| WO | 2018106862 | A1 | 6/2018 |
| WO | 2018156494 | A1 | 8/2018 |
| WO | 2018187057 | A1 | 10/2018 |
| WO | 2018234862 | A1 | 12/2018 |

OTHER PUBLICATIONS

Bichakjian et al., "Merkel Cell Carcinoma, Version Jan. 2018, NCCN Clinical Practice Guidelines in Oncology", J Natl Compr Canc Netw (2018), 16(6):742-74.

Brantsch et al., "Analysis of risk factors determining prognosis of cutaneous squamous-cell carcinoma: a prospective study", Lancet Oncol (2008), 9(8):713-20.

Christensen, "Recent advances in field cancerization and management of multiple cutaneous squamous cell carcinomas", F1000Res (2018), 7.

D'Amico et al., "Pretreatment PSA velocity and risk of death from prostate cancer following external beam radiation therapy", JAMA (2005), 294(4):440-47.

Danial et al., "An Investigator-Initiated Open-Label Trial of Sonidegib in Advanced Basal Cell Carcinoma Patients Resistant to Vismodegib", Clin. Cancer Res. (2016), 22:1325-29.

Euvard et al., "Skin cancers after organ transplantation", New Engl. J. Med. (2003), 348(17):1681-91.

Fernandez et al., "Biologic Therapy in the Treatment of Chronic Skin Disorders", Immunol Allergy Clin North Am (2017), 37(2):315-27.

Gorelik et al., "Preclinical characterization of a novel fully human IgG1 anti-PD-L1 mAb CK-301". American Association for Cancer Research Annual Meeting (AACR) (Apr. 4, 2016), Abstract 4606.

Guy et al., "Prevalence and costs of skin cancer treatment in the U.S., 2002-2006 and 2007-2011", Am. J. Prev. Med. (2015), 48(2):183-87.

Harris et al., "Factors Associated with Recurrence and Regional Adenopathy for Head and Neck Cutaneous Squamous Cell Carcinoma", Otolaryngol Head Neck Surg (2017), 156(5):863-69.

International Search Report and Written Opinion dated Mar. 9, 2020 in Application PCT/US2019/061212.

Karia et al., "Cutaneous squamous cell carcinoma: estimated incidence of disease, nodal metastasis, and deaths from disease in the United States, 2012", J. Am. Acad. Dermatol. (2013), 68:957-66.

Lipson et al., "Tumor Regression and Allograft Rejection after Administration of Anti-PD-1", New Engl. J. Med. (2016), 374(9):896-98.

Lomas et al., "A systematic review of worldwide incidence of nonmelanoma skin cancer", Br J Dermatol. (2012), 166(5):1069-80.

Madan, "Non-melanoma skin cancer", Lancet (2010), 375:673-85.

Manyam et al., "A multi-institutional comparison of outcomes of immunosuppressed and immunocompetent patients treated with surgery and radiation therapy for cutaneous squamous cell carcinoma of the head and neck", Cancer (2017), 123(11):2054-60.

Oken et al., "Toxicity and response criteria of the Eastern Cooperative Oncology Group", Am J Clin Oncol (1982), 5(6):649-55.

Pham et al., "Prospective Quality of Life in Men Choosing Active Surveillance Compared to Those Biopsied but not Diagnosed with Prostate Cancer", J Urol (2016), 196(2):392-98.

Porceddu et al., "Postoperative Concurrent Chemoradiotherapy Versus Postoperative Radiotherapy in High-Risk Cutaneous Squamous Cell Carcinoma of the Head and Neck: The Randomized Phase III TROG 05.01 Trial", J Clin Oncol (2018), 36(13):1275-83.

Powell et al., "Compendium of excipients for parenteral formulations" PDA, J Pharm Sci Technol (1998), 52:238-311.

Que et al., "Cutaneous squamous cell carcinoma: Incidence, risk factors, diagnosis, and staging", J Am Acad Dermatol (2018), 78(2):237-47.

Rees et al., "Survival after squamous cell and basal cell carcinoma of the skin: a retrospective cohort analysis", Int. J. Cancer (2015), 137:878-84.

Rogers et al., "Incidence Estimate of Nonmelanoma Skin Cancer (Keratinocyte Carcinomas) in the U.S. Population, 2012", JAMA Dermatol. (2015), 151(10):1081-86.

Rogers et al., "Incidence estimate of nonmelanoma skin cancer in the United States, 2006", Arch Dermatol (2010), 146(3):283-87.

Starke et al., "Renal tubular PD-L1 (CD274) suppresses alloreactive human T-cell responses", Kidney Int. (2010), 78(1):38-47.

Stratigos, "Diagnosis and treatment of invasive squamous cell carcinoma of the skin: European consensus-based interdisciplinary guideline", Eur J Cancer (2015), 51(14):1989-2007.

Taylor et al., "A transgenic mouse that expresses a diversity of human sequence heavy and light chain immunoglobulin", sNucl. Acids Res. (1992), 20:6287-6295.

Thompson et al., "Risk Factors for Cutaneous Squamous Cell Carcinoma Recurrence, Metastasis, and Disease-Specific Death: A Systematic Review and Meta-analysis", JAMA Dermatol 2016 (2016), 152(4):419-28.

Van Hooren et al. "Local checkpoint inhibition of CTLA-4 as a monotherapy or in combination with anti-PD1 prevents the growth of murine bladder cancer" European Journal of Immunology (Feb. 1, 2017), 47(2):385-393.

Wu et al., "Receptor-mediated in vitro gene transformation by a soluble DNA carrier system", J. Biol. Chem. (1987), 262: 4429-32.

Anonymous, "History of Changes for Study: NCT03698019—Pembrolizumab in Treating Patients With Stage III-IV High-Risk Melanoma Before and After Surgery" (Oct. 4, 2018) available at https://clinicaltrials.gov/ct2/history/NCT03698019?V_1=View#StudyPageTop.

Regeneron Pharmaceuticals, Inc., "Libtayo (cemiplimab-rwlc) Label" (2018) (17 pp.) available at https://www.accessdata.fda.gov/drugsatfda_docs/label/2018/761097s000lbl.pdf.

Magellan Health, Inc. "Libtayo (cemiplimab-rwlc) (Intravenous)" (2018), (4 pp.) available at https://specialtydrug.magellanprovider.com/media/99225/libtayo.pdf.

Cassler, N. M. et al., "Merkel Cell Carcinoma Terhapeutic Update", Current Treatment Options in Oncology, (May 2005), Springer US, Boston, 17(7):1-18.

Eisenhauer et al., "New response evaluation criteria in solid tumours: revised RECIST guideline (version 1.1)", Eur J Cancer (2009), 45(2):228-47.

International Search Report and Written Opinion dated May 28, 2020, issued in Application No. PCT/US20/20018.

Leitenberger et al., "Defining recurrence of nonmelanoma skin cancer after Mohs micrographic surgery: Report of the American College of Mohs Surgery Registry and Outcomes Committee", J Am Acad Dermatol (2016), 75(5):1022-31.

Young et al., "Measurement of clinical and subclinical tumour response using [18F]-fluorodeoxyglucose and positron emission tomography: review and 1999 EORTC recommendations. European Organization for Research and Treatment of Cancer (EORTC) PET Study Group", European J of Cancer, (1999), 35(13): 1773-82.

Zhang et al., "Structural basis of a novel PD-L1 nanobody for immune checkpoint blockade", Cell Discovery, (Mar. 2017), 3: 170004.

Anonymous, "A Study to Compare the Administration of Pembroizumab After Surgery Versus Administration Both Before and After Surgery for High-Risk Melanoma" U.S. National Library of Medicine, printed on Mar. 8, 2022, available at https://clinicaltrials.gov/ct2/show/NCT03698019 (12 pages).

Anonymous, "History of Changes for Study: NCT03833167, Pembrolizumab Versus Placebo Following Surgery and Radiation in

(56) References Cited

OTHER PUBLICATIONS

Participants With Locally Advanced Cutaneous Squamous Cell Carcinoma (MK-3475-630/KEYNOTE-630)", U.S. National Library of Medicine, Printed on Mar. 8, 2022, available at https://clinicaltrials.gov/ct2/history/NCT03833167?A+1&B+1&C+merges#StudyPageTop (9 pages).

Amin et al., "The Eighth Edition AJCC Cancer Staging Manual: Continuing to build a bridge from a population-based to a more "personalized" approach to cancer staging. CA: A Cancer Journal for Clinicians", CA Cancer J Clin (2017), 67(2): 93-99.

Chalmers et al., "Analysis of 100,000 human cancer genomes reveals the landscape of tumor mutational burden", Genome Med (2017), 9(1):34.

Christenson et al., "Incidence of basal cell and squamous cell carcinomas in a population younger than 40 years", JAMA (2005), 294(6):681-90.

Cottrell et al., "Pathologic features of response to neoadjuvant anti-PD-1 in resected non-small-cell lung carcinoma: a proposal for quantitative immune-related pathologic response criteria (irPRC)", Ann Oncol (2018), 29(8):1853-1860.

Gerring et al., "Orbital exenteration for advanced periorbital non-melanoma skin cancer: prognostic factors and survival", Eye (Lond) (2017), 31(3):379-388.

Goodman et al., "Phenotypic and Genomic Determinants of Immunotherapy Response Associated with Squamousness", Cancer Immunol Res (2019), 7(6):866-873.

Grobb et al., "Pembrolizumab monotherapy for recurrent or metastatic cutaneous squamous cell carcinoma: a single-arm phase II trial (KEYNOTE-629)", J Clin Oncol (2020), 38(25):2916-2925.

Housman et al., "Skin cancer is among the most costly of all cancers to treat for the Medicare population", J Am Acad Dermatol (2003), 48(3):425-9.

Jubran et al., "High-risk squamous cell carcinoma and its impact on a 62-year-old male surgeon", BMJ Case Rep (2019), 12(8).

Migden et al., "Cemiplimab in locally advanced cutaneous squamous cell carcinoma: results from an open-label, phase 2, single-arm trial", Lancet Oncol (2020), 21(2):294-305 (In eng).

Mukoyama et al., "Prospective evaluation of health-related quality of life in patients undergoing anterolateral craniofacial resection with orbital exenteration", J Neurol Surg B Skull Base (2020), 81(5):585-593.

Nehal et al., "Update on keratinocyte carcinomas", N Engl J Med (2018), 379(4):363-374.

O'Sullivan et al., "UICC Manual of Clinical Oncology", 9th ed. Geneva, Switzerland: Union for International Cancer Control, 2015.

Stein et al., "Pan-tumor pathologic scoring of response to PD-(L)1 blockade", Clin Cancer Res (2020), 26(3):545-51.

Sweeny et al., "Head and neck cutaneous squamous cell carcinoma requiring parotidectomy: prognostic indicators and treatment selection", Otolaryngol Head Neck Surg (2014), 150(4):610-7.

Topalian et al., "Neoadjuvant Nivolumab for Patients With Resectable Merkel Cell Carcinoma in the CheckMate 358 Trial", J Clin Oncol (2020), 38(22):2476-2487.

Uprety et al., "Neoadjuvant immunotherapy for NSCLC: current concepts and future approaches", J Thorac Oncol (2020), 15(8):1281-1297.

Xu et al., "First bite syndrome after parotidectomy: a case series and review of literature", Ear Nose Throat J (2020): 145561320980179.

Gaiser et al., "PD-L1 inhibition with avelumab for metastatic Merkel cell carcinoma," Expert Rev Clin Pharmacol. (2018), 11(4): 345-59.

Weber et al., "Adjuvant Nivolumab versus Ipilimumab in Resected Stage III or IV Melanoma," N Engl J Med (2017), 377(19): 1824-35.

Anonymous, "A Study to Compare the Administration of Pembrolizmab After Surgery Versus Administration Both Before and After Surgery for High-Risk Melanoma", Natl. Cancer Inst. (2018), available at https://clinicaltrials.gov/ct2/show/NCT03698019?term=administration+of+pembrolizumab&draw=2&rank=4 (13 pages).

Eggermont et al., "Adjuvant Pembrolizumab versus Placebo in Resected Stage III Melanoma", N Engl J Med (2018), 378:1789-1801.

Anonymous, "Pembrolizumab (MK-3475) Versus Placebo Following Surgery and Radiation in Participants With Locally Advanced Cutaneous Squamous Cell Carcinoma (MK-3475-630/KEYNOTE-630)", availble at https://clinicaltrials.gov/ct2/show/NCT03833167?term=pembrolizumab+placebo&draw=2&rank=9 (2019), (9 pages).

Porceddu et al., "Nonmelanoma Cutaneous Head and Neck Cancer and Merkel Cell Carcinoma: Current Concepts, Advances, and Controversies", J Clin Oncol (2015), 33(29):3338-45.

Anonymous, NCT02760498: A Phase 2 Study of REGN2810, a Fully Human Monoclonal Antibody to Programmed Death-1 (PD-1), in Patients With Advanced Cutaneous Squamous Cell Carcinoma, ClinicalTrials.gov Archive, https://Clinicaltrials.gov/archive/NCT02760498/2016_05_02 (2016).

Mahoney et al, "The Next Immune-Checkpoint Inhibitors: PD-1/PD-L1 Blockade in Melanoma", Clinical Therapeutics, (2015), 37, 1: 764-782.

Topalian et al. Safety, activity, and immune correlates of anti-PD-1 antibody in cancer. N Engl J Med. (2012), 366(26):2443-2454.

Baker, "PD-1 inhibition in advanced Merkel-cell carcinoma," The Lancet (2016), (16)30112-7, https://dx.doi.org/10.1016/S1470-2045.

Chang et al., "A Case Report of Unresectable Cutaneous Squamous Cell Carcinoma Responsive to Pembrolizumab, a Programmed Cell Death Protein 1 Inhibitor," JAMA Dermatology, (2015), Letters: E1-E3.

Wiznia et al., "Treatment of Basal Cell Carcinoma in the Elderly: What Nondermatologists Need to Know," Am J Med, Excerpta Medica, Inc, US (2016), 129(7):655-660.

"ESMO 2014: Results of a Phase III Randomised Study of Nivolumab in Patients with Advanced Melanoma After Prior Anti-CTLA4 Therapy", European Society for Medical Oncology (2014).

Keir et al., "Programmed Death-1 (PD-1): PD-Ligand 1 Interactions Inhibit TCR-Mediated Positive Selection of Thymocytes"; J of Immunology; (2005) 175(11):7372-7379.

Riella et al., "Role of the PD-1 Pathway in the Immune Response"; Am J of Transplantation, (2012), 12(10):2575-2587.

Da Silva, "Anti-PD-1 monoclonal antibody Cancer immunotherapy"; Drugs of the Future; (2014), 39(1):15-24.

Brahmer et al., "Phase I Study of Single-Agent Anti-Programmed Death-1 (MDX-1106) in Refractory Solid Tumors: Safety, Clinical Activity, Pharmacodynamics, and Immunologic Correlates" J of Clin Oncol, (2010), 28(9): 3167-3175.

Zoran et al., "Programmed death 1 (PD-1) lymphocytes and ligand (PD-L1) in colorectal cancer and their relationship to microsatellite instability status"; J Clin Oncol; 32(5s)(abstr 3625), 2 pgs (May 30, 2014), available at http://meetinglibrary.asco.org/content/133958-144.

Mcdermott et al., "PD-1 as a potential target in cancer therapy" Cancer Med., 2(5):662-673 (2013).

Tsai et al., "PD-1 and PD-L1 Antibodies for Melonama", Human Vaccines & Immunotherapeutics (2014) 10:3111-3116.

Momtaz et al., "Immunoligic Checkpoints in Cancer Therapy: Focus on the Programmed Death-I (PD-I) Receptor Pathway", Pharmacogenomics and Personalized Medicine (2014) 7:357-365.

Migden et al., "PD-1 Bloackade with Cemiplimab in Advanced Cutaneous Squamous-Cell Carnioma", N Engl J Med (2018), 379(4): 341-351.

Anonymous, "Intralesional Cemiplimab for Patients With Cutaneous Squamous Cell Carcinoma or Basil Cell Carcinoma", retrieved on Jul. 11, 2022 at URL:https://clinicaltrials.gov/ct2/show/NCT03889912?term=cemiplimab&draw=2&rank=7 (6 pages).

Samoylenko et al., "Intralesional anti-PD1 treatment in patients with metastic melanoma: The pilot study," J Clin Oncol (2018), 36(5 Supp): 188.

Kaplon et al., "Antibodies to watch in 2018," mAbs (2018), 10(2): 183-203.

Anonymous, "Kegg Drug: Cemiplimab," (2018) retrieved from <https://www.genome.jp/dbget-bin/www_bget?dr:D11108> on Oct. 8, 2024.

(56) References Cited

OTHER PUBLICATIONS

Markham et al., "Cemplimab: First Global Approval," Drugs (2018), 78: 1841-46.
Liang et al., "Radiation-induced equilibrium is a balance between tumor cell proliferation and T cell-mediated killing," J. Immunol. (Jun. 2013), 190(11): 5874-81.

* cited by examiner

INTRALESIONAL ADMINISTRATION OF PD-1 INHIBITORS FOR TREATING SKIN CANCER

CROSS-REFERENCE TO RELATED APPLICATIONS

This application is a U.S. national phase application under 35 U.S.C. § 371 of International Patent Application No. PCT/US19/61212 filed Nov. 13, 2019, which claims the benefit of priority to U.S. Provisional Patent Application No. 62/767,218 filed Nov. 14, 2018, the disclosures of which are hereby incorporated by reference herein in their entireties.

FIELD OF THE INVENTION

The present disclosure relates to methods for treating or inhibiting the growth of a tumor that includes selecting a patient with skin cancer and intralesionally administering to the tumor of the patient a therapeutically effective amount of a programmed death 1 (PD-1) inhibitor.

BACKGROUND

Skin cancer is the most common cancer in the United States (Guy et al., *Am. J. Prev. Med.* 48:183-87, 2015). An estimated 5.4 million cases of non-melanoma skin cancer, including basal cell carcinoma and squamous cell carcinoma, were diagnosed in the United States in 2012 (Rogers et al., *JAMA Dermatol.*, 151(10):1081-86, 2015). Cutaneous squamous cell carcinoma (CSCC) is the second-most common malignancy in the United States, after basal cell carcinoma (BCC) (Karia et al., *J. Am. Acad. Dermatol.* 68:957-66, 2013). Chronic sun exposure is the dominant risk factor for non-melanoma skin cancers.

CSCC is a malignant proliferation of epidermal keratinocytes with invasion of the dermis and is distinguished from non-invasive precursor lesions such as actinic keratoses (Fernandez et al., *Immunol Allergy Clin North Am* 37(2): 315-27, 2017). Worldwide incidence varies widely, with the highest incidence in Australia and the lowest incidence in parts of Africa (Lomas et al., *Br J Dermatol,* 166(5):1069-80, 2012). The precise incidence of CSCC is not known because it is not included in most cancer registries. However, the incidence of CSCC has increased in recent decades according to estimates that do not include patients with only non-invasive precursor lesions (Lomas et al., *Br J Dermatol,* 166(5):1069-80, 2012) (Que et al., *J Am Acad Dermatol,* 78(2):237-47, 2018) (Rogers et al., *Arch Dermatol,* 146(3): 283-87, 2010).

Risk factors for CSCC include UV exposure, advanced age, and immunosuppression (Alam et al., *New Engl. J. Med.* 344:975-83, 2001; Madan, *Lancet* 375:673-85, 2010). Although the vast majority of individuals diagnosed with CSCC or BCC have a very favorable prognosis, CSCC has a greater propensity for aggressive recurrences than BCC. Also, individuals diagnosed with CSCC, unlike those diagnosed with BCC, have an increased mortality compared with age-matched controls (Rees et al., *Int. J. Cancer* 137:878-84, 2015).

Surgical resection is the centerpiece of clinical management of CSCC or BCC. The primary goal is complete resection of cancer, and acceptable cosmetic outcome is a secondary goal. Factors associated with poor prognosis with CSCC include tumor size >2 cm, tumor depth >2 mm, perineural invasion, host immunosuppression, and recurrent lesions. However, some patients who develop advanced CSCC, which encompasses both locally advanced and metastatic CSCC, are not candidates for surgery. Some such patients may be administered post-operative radiation therapy or chemotherapy, but these may not be attractive options due to safety and tolerability concerns.

Field cancerization, defined as multiple cancerous lesions in UV exposed sites, is a characteristic of many CSCC patients. Additionally, recurrent CSCC increases the risk of subsequent recurrences. In a single institution retrospective study of 212 patients, recurrent CSCCs were twice as likely to recur again after excisional surgery as compared to primary CSCCs (Harris et al., *Otolaryngol Head Neck Surg,* 156(5):863-69, 2017). Multiple surgeries over time can be disfiguring and lead to surgical fatigue—i.e., physical and emotional debilitation resulting from serial surgical procedures. Also, CSCC in subsites of the head and neck, such as ear, temple, and lip, have been associated with worse clinical outcomes (Brantsch et al., *Lancet Oncol* 9(8):713-20, 2008; Harris et al., *Otolaryngol Head Neck Surg,* 156(5):863-69, 2017; Thompson et al., *JAMA Dermatol* 2016; 152(4):419-28, 2016).

The most common clinical subtype of BCC is nodular BCC. Less common clinical subtypes are superficial, morphoeic (fibrosing), and fibroepithelial. Most patients are cured by surgery, but a small percentage of patients experience recurrent lesions or develop unresectable locally advanced or metastatic disease. Recognition of the oncogenic role of the G-protein receptor Smoothened (SMO) in BCC led to the development of vismodegib and sonidegib, orally available inhibitors of SMO, generally referred to as Hedgehog Inhibitors (HHIs). In addition to adverse side-effects of the HHIs, it was found that for patients that progress on one HHI (vismodegib), subsequent treatment with another HHI (sonedegib) did not result in tumor inhibition (Danial et al., *Clin. Cancer Res.* 22:1325-29, 2016).

Therefore, there remains a need to provide safe and effective therapies for skin cancer, such as CSCC and BCC, especially skin cancer that has recurred despite prior surgeries.

Further, a small fraction of CSCC patients are considered to have high risk CSCC, as assessed using a number of factors, including cancer staging using the American Joint Committee on Cancer, 8th Edition (AJCC, 2017), immune status, lymphovascular invasion, extent of nodal involvement, presence of extracapsular extension and treatment history. Post-operative radiotherapy is recommended in high risk cases (Bichakjian et al., *J Natl Compr Canc Netw,* 16(6):742-74, 2018) (Stratigos, *Eur J Cancer,* 51(14):1989-2007, 2015). However, high risk patients may relapse with locoregional recurrence or distant metastases (Porceddu et al., *J Clin Oncol,* 36(13):1275-83, 2018). Thus, there is an unmet need to reduce the risk of CSCC recurrence, especially in high risk patients.

Additionally, transplant recipients are known to be at higher risk for CSCC than for any other tumor type (Euvard et al., *New Engl. J. Med.,* 348(17):1681-91, 2003). CSCC also has a more aggressive clinical course in transplant patients as compared to immunocompetent CSCC patients (Manyam et al., *Cancer,* 123(11):2054-60, 2017). Systemic administration of PD-1 inhibitors in transplant patients presents a high risk of allograft rejection or injury (Lipson et al., *New Engl. J. Med.,* 374(9):896-98, 2016; Aguirre et al., *The Oncologist,* 24:394-401, Nov. 9, 2018; Starke et al., *Kidney Int,* 78(1):38-47, 2010). Thus, there is an unmet need to effectively treat skin cancer, such as CSCC, in transplant patients while avoiding or reducing the risks associated therewith.

SUMMARY

In one aspect, the disclosed technology relates to a method of treating or inhibiting the growth of a tumor, including: selecting a patient with a skin cancer; and intralesionally administering to the tumor of the patient one or more doses of a pharmaceutical composition including a therapeutically effective amount of a programmed death 1 (PD-1) inhibitor. In one embodiment, the skin cancer is cutaneous squamous cell carcinoma (CSCC), basal cell carcinoma (BCC), Merkel cell carcinoma, or melanoma. In another embodiment, the skin cancer is CSCC. In another embodiment, the skin cancer is recurrent resectable CSCC. In another embodiment, the patient has had prior treatment for the cancer. In another embodiment, the prior treatment includes surgery, radiation, chemotherapy, treatment with a PD-1 inhibitor, and/or other anti-tumor therapy. In another embodiment, the patient is at risk of recurrence. In another embodiment, the patient has a prior history of recurrence after surgery. In another embodiment, the skin cancer patient has previously received an organ or tissue transplant.

In another embodiment, each dose of the PD-1 inhibitor includes one or more intralesional injections of the pharmaceutical composition into the tumor. In another embodiment, at least two intralesional injections are administered into different locations of the tumor. In another embodiment, two to five intralesional injections are administered into two to five locations of the tumor. In another embodiment, at least one intralesional injection is administered into the upper half of the tumor. In another embodiment, at least one intralesional injection is administered into skin overlying the tumor. In another embodiment, at least one intralesional injection is administered into a superior periphery of the tumor, adjacent an interface with normal-appearing skin. In another embodiment, the tumor has a surface diameter of at least 1 cm. In another embodiment, the tumor has a surface diameter of about 2 cm.

In another embodiment, each dose is administered once a day, once in two days, once in three days, once in four days, once in five days, once in six days, once a week or twice a week. In another embodiment, each dose includes 5 mg to 200 mg of the PD-1 inhibitor. In another embodiment, each dose includes 5 mg, 15 mg, or 44 mg of the PD-1 inhibitor.

In another embodiment, the administration of the PD-1 inhibitor promotes tumor regression, reduces tumor cell load, reduces tumor burden, and/or prevents tumor recurrence in the patient. In one embodiment, the administration of the PD-1 inhibitor reduces or eliminates the need for surgery. In another embodiment, the intralesional administration of the PD-1 inhibitor promotes at least about 10% more tumor regression than intravenous administration of the PD-1 inhibitor. In another embodiment, the intralesional administration of the PD-1 inhibitor leads to lower incidence of adverse events, less severity of adverse events, and/or less toxicity than intravenous administration of the PD-1 inhibitor.

In another embodiment, the method further includes surgically removing the tumor after step (b). In another embodiment, the method further includes administering a second therapeutic agent or therapy selected from surgery, radiation, chemotherapy, a corticosteroid, an anti-inflammatory drug, and/or combinations thereof. In one embodiment, the PD-1 inhibitor is administered before the second therapeutic agent or therapy. In one embodiment, the PD-1 inhibitor is administered after the second therapeutic agent or therapy.

In another embodiment, the PD-1 inhibitor includes an anti-PD-1 antibody or antigen-binding fragment thereof, an anti-PD-L1 antibody or antigen-binding fragment thereof, or an anti-PD-L2 antibody or antigen-binding fragment thereof. In another embodiment, the PD-1 inhibitor is an anti-PD-1 antibody or antigen-binding fragment thereof that includes a heavy chain variable region (HCVR) including the amino acid sequence of SEQ ID NO: 1 and a light chain variable region (LCVR) including the amino acid sequence of SEQ ID NO: 2. In another embodiment, the HCVR includes three heavy chain complementarity determining regions (CDRs) (HCDR1, HCDR2 and HCDR3) and the LCVR includes three light chain CDRs (LCDR1, LCDR2 and LCDR3), wherein: HCDR1 has an amino acid sequence of SEQ ID NO: 3; HCDR2 has an amino acid sequence of SEQ ID NO: 4; HCDR3 has an amino acid sequence of SEQ ID NO: 5; LCDR1 has an amino acid sequence of SEQ ID NO: 6; LCDR2 has an amino acid sequence of SEQ ID NO: 7; and LCDR3 has an amino acid sequence of SEQ ID NO: 8. In another embodiment, the anti-PD-1 antibody or antigen-binding fragment thereof includes a HCVR/LCVR sequence pair of SEQ ID NOs: 1/2. In another embodiment, the anti-PD-1 antibody includes a heavy chain and a light chain, wherein the heavy chain has an amino acid sequence of SEQ ID NO: 9. In another embodiment, the anti-PD-1 antibody includes a heavy chain and a light chain, wherein the light chain has an amino acid sequence of SEQ ID NO: 10. In another embodiment, the anti-PD-1 antibody includes a heavy chain and a light chain, wherein the heavy chain has an amino acid sequence of SEQ ID NO: 9 and the light chain has an amino acid sequence of SEQ ID NO: 10.

In another embodiment, the PD-1 inhibitor is cemiplimab or a bioequivalent thereof. In another embodiment, the PD-1 inhibitor is an anti-PD-1 antibody selected from the group consisting of cemiplimab, nivolumab, pembrolizumab, pidilizumab, MED10608, BI 754091, PF-0680159, spartalizumab, camrelizumab, JNJ-63723283, and MCLA-134. In another embodiment, the PD-1 inhibitor is an anti-PD-L1 antibody selected from the group consisting of H2M8314N, avelumab, atezolizumab, durvalumab, MDX-1105, LY3300054, FAZ053, STI-1014, CX-072, KN035, and CK-301.

In another aspect, the disclosed technology relates to an intralesional injection solution for treating or inhibiting the growth of a tumor in a subject with skin cancer, including a therapeutically effective amount of a programmed death 1 (PD-1) inhibitor and a pharmaceutically acceptable carrier or diluent. In one embodiment, the PD-1 inhibitor is an anti-PD-1 antibody or antigen-binding fragment thereof including a heavy chain variable region (HCVR) including the amino acid sequence of SEQ ID NO: 1 and a light chain variable region (LCVR) including the amino acid sequence of SEQ ID NO: 2. In another embodiment, the HCVR includes three heavy chain complementarity determining regions (CDRs) (HCDR1, HCDR2 and HCDR3) and the LCVR includes three light chain CDRs (LCDR1, LCDR2 and LCDR3), wherein: HCDR1 has an amino acid sequence of SEQ ID NO: 3; HCDR2 has an amino acid sequence of SEQ ID NO: 4; HCDR3 has an amino acid sequence of SEQ ID NO: 5; LCDR1 has an amino acid sequence of SEQ ID NO: 6; LCDR2 has an amino acid sequence of SEQ ID NO: 7; and LCDR3 has an amino acid sequence of SEQ ID NO: 8. In another embodiment, the anti-PD-1 antibody or antigen-binding fragment thereof includes a HCVR/LCVR sequence pair of SEQ ID NOs: 1/2. In one embodiment, the PD-1 inhibitor is present at a concentration of 20 mg/mL in the intralesional injection solution. In one embodiment, the PD-1 inhibitor is present at a concentration of 60 mg/mL in the intralesional injection solution. In one embodiment, the PD-1 inhibitor is present at a concentration of 175 mg/mL in the intralesional injection solution.

In another embodiment, the intralesional injection solution includes 5 mg to 200 mg of the PD-1 inhibitor. In another embodiment, the intralesional injection solution includes 5 mg, 15 mg, or 44 mg of the PD-1 inhibitor. In another embodiment, the skin cancer is CSCC.

DETAILED DESCRIPTION

Figure 1:
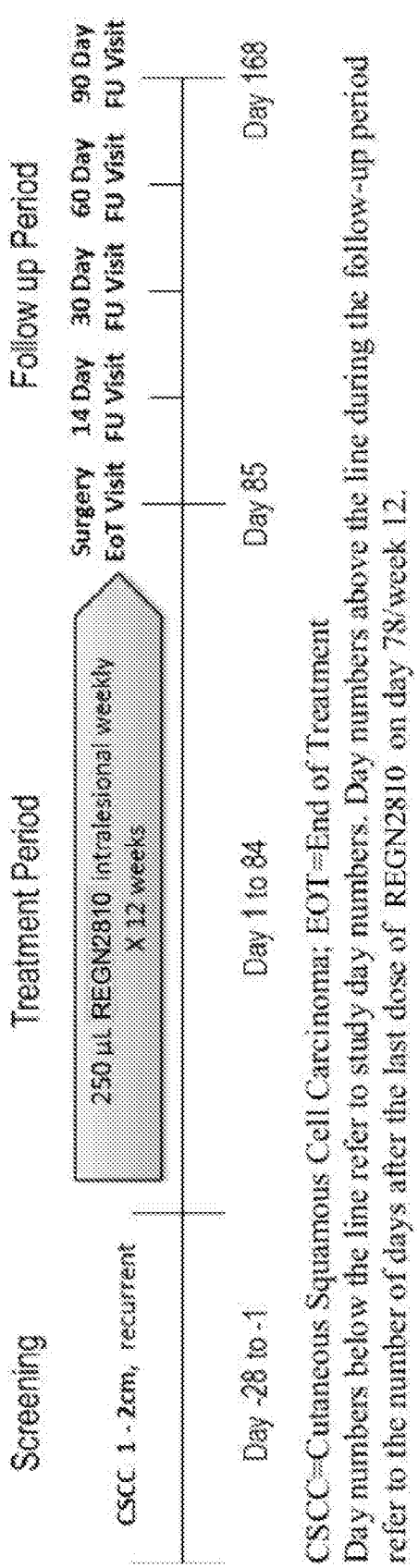
FIG. 1 shows a diagram outlining the study described in Example 1.

It is to be understood that the present disclosure is not limited to the particular methods and experimental conditions described, as such methods and conditions may vary. It is also to be understood that the terminology used herein is for the purpose of describing particular embodiments only, and is not intended to be limiting, and that the scope of the present disclosure will be limited only by the appended claims.

Unless defined otherwise, all technical and scientific terms used herein have the same meaning as commonly understood by one of ordinary skill in the art to which the disclosed invention belongs. As used herein, the term "about," when used in reference to a particular recited numerical value, means that the value may vary from the recited value by no more than 1%. For example, as used herein, the expression "about 100" includes 99 and 101 and all values in between (e.g., 99.1, 99.2, 99.3, 99.4, etc.).

Although any methods and materials similar or equivalent to those described herein can be used in the practice of the present disclosure, the preferred methods and materials are now described.

Methods of Treating or Inhibiting Growth of a Tumor

The present disclosure includes methods for treating or inhibiting the growth of skin cancer comprising intralesionally administering to a skin cancer tumor lesion of a subject in need thereof a therapeutically effective amount of a PD-1 inhibitor (e.g., an antibody or antigen-binding fragment thereof that specifically binds PD-1, PD-L1, and/or PD-L2, or any other "PD-1 inhibitor" as described herein). In the present disclosure, references to anti-PD-1 antibodies in particular are provided to illustrate a representative PD-1 inhibitor, and do not limit the scope of the disclosure. In some embodiments, the methods include intralesionally administering a PD-1 inhibitor to a skin cancer tumor lesion of a subject in need thereof, wherein the subject may optionally be a transplant recipient.

Intralesional administration, as disclosed herein, provides for several advantages in the treatment of skin cancer. For instance, intralesional administration provides an improved localized treatment that introduces a PD-1 inhibitor (such as an anti-PD-1 antibody) directly into a tumor lesion of the subject, thus allowing for efficient administration of the inhibitor at a higher concentration specifically at the site of administration. Such localized treatment provides a further advantage by protecting the treated subject from systemic exposure to PD-1 inhibitors, and any toxicity or side effects associated therewith. Additionally, intralesional administration of a PD-1 inhibitor (such as an anti-PD-1 antibody) induces immune memory responses that advantageously reduce the risk of tumor lesion recurrence in treated subjects. In other words, after administering an anti-PD-1 antibody, subsequent doses of anti-PD-1 antibody produce faster and more effective responses in the subject, providing the benefits of a long-lasting, antigen-specific, protective immunity, often referred to as immunological memory. Yet another advantage of intralesional administration of a PD-1 inhibitor is the elimination of the need for surgery, which is often a painful and disfiguring procedure, particularly in instances where repeated surgeries (which cause further disfigurement) would otherwise be needed.

Further, intralesional administration of a PD-1 inhibitor (such as an anti-PD-1 antibody) provides an added benefit for treating skin cancer in a patient that is also an organ or tissue transplant recipient because adverse events associated with systemic administration (e.g., intravenous infusion) would be avoided. This is a particularly significant advantage because organ and tissue transplant recipients are at a greater risk for skin cancer due to continuing immune suppression following organ transplantation. Hence, the incidence of adverse events such as allograft rejection or injury in this patient population is significantly reduced by intralesional (rather than systemic) administration of a PD-1 inhibitor, such as an anti-PD-1 antibody.

As used herein, the expression "intralesional administration" refers to the direct delivery of a PD-1 inhibitor (e.g., an anti-PD-1 antibody) percutaneously into a skin cancer tumor lesion and also includes the direct delivery of a PD-1 inhibitor intradermally into the skin overlying the skin cancer tumor lesion. In many embodiments, the terms "intralesional administration" and "intralesional injection" are used interchangeably.

As used herein, the terms "treating", "treat", or the like, mean to alleviate or reduce the severity of at least one symptom or indication, to eliminate the causation of symptoms either on a temporary or permanent basis, to delay or inhibit tumor growth, to reduce tumor cell load or tumor burden, to promote tumor regression, to cause tumor shrinkage, necrosis and/or disappearance, to prevent tumor recurrence, to prevent or inhibit metastasis, to inhibit metastatic tumor growth, to eliminate the need for surgery, and/or to increase duration of survival of the subject. In many embodiments, the terms "tumor", "lesion," "tumor lesion," "cancer," and "malignancy" are used interchangeably and refer to one or more growths.

In some embodiments, the skin cancer is cutaneous squamous cell carcinoma (CSCC), basal cell carcinoma (BCC), Merkel cell carcinoma, or melanoma. In some embodiments, the skin cancer is a squamous cell carcinoma of head and neck. In some embodiments, the skin cancer is a metastatic, resectable, unresectable, recurrent, or locally advanced. In some embodiments, the skin cancer is CSCC, including but not limited to metastatic CSCC, locally advanced CSCC, resectable CSCC, unresectable CSCC, or recurrent CSCC. In one embodiment, the skin cancer is CSCC that is resectable and recurrent. In one embodiment, the skin cancer is advanced CSCC.

As used herein, the term "recurrent" refers to a frequent or repeated diagnosis of skin cancer (e.g., CSCC) in a patient or a frequent or repeated occurrence of individual tumor lesion(s), such as primary tumor lesions and/or new tumor lesions that may represent recurrence of a prior tumor lesion. In certain embodiments, intralesional administration of the PD-1 inhibitor inhibits the recurrence of tumor lesions in patients with CSCC.

As used herein, the term "recurrence" is defined as the appearance of one or more new skin cancer (e.g., CSCC) lesions that are local, regional, or distant. In many instances, new lesions in the skin are new primary tumors due to field cancerization from chronic UV-mediated skin damage (Christensen, *F1000Res,* 7, 2018). With respect to CSCC, local or regional (locoregional) recurrence is defined by any of the following sites of disease recurrence: (a) for HN CSCC, nodal or soft tissue recurrence above the clavicle; (b) for non-HN CSCC, recurrence within the first draining nodal basin (or soft tissue associated within the first draining nodal basin) of the resected tumor; (c) in-transit metastases, defined as skin or subcutaneous metastases that are >2 cm from the primary lesion but are not beyond the regional nodal basin. Distance recurrence is defined by any of the following sites of disease recurrence: (a) for HN CSCC, nodal recurrence below the clavicle; (d) for non-HN CSCC, recurrence beyond the first draining nodal basin of the resected tumor bed. Recurrence in 2 nodal basins will be considered distant recurrence, even if contiguous (i.e., 2 mediastinal nodal basins, 2 pelvic nodal basins); (e) recurrence in non-nodal tissue (including, but not limited to, lung, liver, bone, brain); (f) epidermotropic metastases, defined as distant lesion(s) in the dermis without epidermal involvement.

As used herein, the expression "a subject in need thereof" means a human or non-human mammal that exhibits one or more symptoms or indications of skin cancer, and/or who has been diagnosed with skin cancer, including a solid tumor and who needs treatment for the same. In many embodiments, the terms "subject" and "patient" are used interchangeably. The expression includes subjects with primary, established, or recurrent tumor lesions. In specific embodiments, the expression includes human subjects that have and/or need treatment for a solid tumor. The expression also includes subjects with primary or metastatic tumors (advanced malignancies). In certain embodiments, the expression includes patients with a solid tumor that is resistant to or refractory to or is inadequately controlled by prior therapy (e.g., surgery or treatment with an anti-cancer agent such as carboplatin or docetaxel). In certain embodiments, the expression includes patients with a tumor lesion that has been treated with one or more lines of prior therapy (e.g., surgically removed), but which has subsequently recurred. In certain embodiments, the expression includes subjects with a skin cancer tumor lesion who are not candidates for curative surgery or curative radiation, or for whom conventional anti-cancer therapy is inadvisable, for example, due to toxic side effects. In other embodiments, the expression includes subjects with a skin cancer tumor lesion for which surgical removal is planned. In other embodiments, the expression includes subjects for whom the risk of recurrence is high due to prior history of recurrence after surgery.

In certain embodiments, the methods of the present disclosure are used in a subject with a solid tumor. As used herein, the term "solid tumor" refers to an abnormal mass of tissue that usually does not contain cysts or liquid areas. Solid tumors may be benign (not cancer) or malignant (cancer). For the purposes of the present disclosure, the term "solid tumor" means malignant solid tumors. The term includes different types of solid tumors named for the cell types that form them, viz. sarcomas, carcinomas and lymphomas. In certain embodiments, the term "solid tumor" comprises more than one tumor lesions located separate from one another, e.g., 2 or more, 5 or more, 10 or more, 15 or more, 20 or more, 25 or more lesions in a subject in need of treatment. In certain embodiments, the more than one lesions are located distally from one another.

In certain embodiments, the disclosed methods include administering a therapeutically effective amount of a PD-1 inhibitor (e.g., an anti-PD-1 antibody) in combination with an anti-tumor therapy. As used here, the expression "in combination with" means that the PD-1 inhibitor is administered before, after, or concurrent with the anti-tumor therapy. Anti-tumor therapies include, but are not limited to, conventional anti-tumor therapies such as chemotherapy, radiation, surgery, or as elsewhere described herein. In one embodiment, the anti-tumor therapy comprises surgery.

In certain embodiments, the present disclosure provides methods for treating skin cancer, comprising selecting a subject with a skin cancer tumor lesion and administering one or more doses of a PD-1 inhibitor (such as an anti-PD-1 antibody) intralesionally into one or more locations of the lesion. In some embodiments, the PD-1 inhibitor is intralesionally administered into 2, 3, 4, 5, 6, or 7 locations in a single skin cancer lesion. In some embodiments, the PD-1 inhibitor may be intralesionally administered into 2 to 5 locations in the lesion. In some embodiments, at least one location is the superior (cephalad) half of the lesion. In some embodiments, at least one location is within the most dense portion of the top half of the tumor lesion. In some embodiments, at least one location is the skin overlying the tumor lesion. In some embodiments, at least one location is the superior (cephalad) periphery of the tumor near or adjacent an interface with normal-appearing skin.

In certain embodiments, one or more doses of a PD-1 inhibitor are intralesionally administered into a tumor lesion having a surface diameter of at least 1 cm. In certain embodiments, the lesion has a surface diameter of no more than 2 cm. In one embodiment, the tumor lesion has a surface diameter of 1.0 cm to 2.0 cm. In other embodiments, the tumor lesion is at least 1 cm in each of the longest perpendicular surface diameters of the lesion. In other embodiments, the tumor lesion is no more than 2 cm in each of the longest perpendicular surface diameters of the lesion. In another embodiment, the tumor lesion is 1.0 cm to 2.0 cm in each of the longest perpendicular surface diameters of the lesion.

In some embodiments, the disclosed methods induce immune memory responses that reduce the risk of tumor lesion recurrence in the subject. In one embodiment, intralesionally administering to a subject in need thereof a therapeutically effective amount of a PD-1 inhibitor results in tumor regression and eliminates the need for surgery.

In certain embodiments, the methods of the present disclosure comprise intralesionally administering a therapeutically effective amount of a PD-1 inhibitor (e.g., an anti-PD-1 antibody) to a subject with an advanced solid tumor, such as CSCC. In certain embodiments, the advanced solid tumor is indolent or aggressive. In certain embodiments, the subject is not responsive to, or has relapsed (e.g., experienced a recurrent lesion) after, prior therapy or surgery.

The methods of the present disclosure, according to certain embodiments, include intralesionally administering to a subject a therapeutically effective amount of a PD-1 inhibitor (e.g., an anti-PD-1 antibody) in combination with an additional therapeutic agent or therapeutic regimen or procedure. The additional therapeutic agent or therapeutic regimen or procedure may be administered for increasing anti-tumor efficacy, for reducing toxic effects of one or more therapies and/or for reducing the dosage of one or more therapies. In various embodiments, the additional therapeutic agent or therapeutic regimen or procedure may include one or more of: chemotherapy, cyclophosphamide, surgery, a cancer vaccine, a programmed death ligand 1 (PD-L1) inhibitor (e.g., an anti-PD-L1 antibody), a lymphocyte activation gene 3 (LAGS) inhibitor (e.g., an anti-LAGS antibody), a cytotoxic T-lymphocyte-associated protein 4 (CTLA-4) inhibitor (e.g., ipilimumab), a glucocorticoid-induced tumor necrosis factor receptor (GITR) agonist (e.g., an anti-GITR antibody), a T-cell immunoglobulin and mucin containing-3 (TIM3) inhibitor, a B- and T-lymphocyte attenuator (BTLA) inhibitor, a T-cell immunoreceptor with Ig and ITIM domains (TIGIT) inhibitor, a CD47 inhibitor, an indoleamine-2,3-dioxygenase (IDO) inhibitor, a vascular endothelial growth factor (VEGF) antagonist, an angiopoietin-2 (Ang2) inhibitor, a transforming growth factor beta (TGFβ) inhibitor, an epidermal growth factor receptor (EGFR) inhibitor, an antibody to a tumor-specific antigen [e.g., CA9, CA125, melanoma-associated antigen 3 (MAGES), carcinoembryonic antigen (CEA), vimentin, tumor-M2-PK, prostate-specific antigen (PSA), mucin-1, MART-1, and CA19-9], an anti-CD3/anti-CD20 bispecific antibody, a vaccine (e.g., Bacillus Calmette-Guerin), granulocyte-macrophage colony-stimulating factor, a cytotoxin, a chemotherapeutic agent, an IL-6R inhibitor, an IL-4R inhibitor, an IL-10 inhibitor, a cytokine such as IL-2, IL-7, IL-21, and IL-15, an anti-inflammatory drug such as a corticosteroid, a non-steroidal anti-inflammatory drug (NSAID), and a dietary supplement such as an antioxidant. In certain embodiments, the PD-1 inhibitor (e.g., an anti-PD-1 antibody) may be administered in combination with therapy including a chemotherapeutic agent and/or surgery.

In certain embodiments, intralesionally administering to a subject with a skin cancer lesion and in need thereof a therapeutically effective amount of a PD-1 inhibitor (e.g., an anti-PD-1 antibody) leads to increased inhibition of tumor growth—e.g., greater tumor regression in the treated subject. In certain embodiments, intralesional administration of a PD-1 inhibitor promotes at least about 10%, about 20%, about 30%, about 40%, about 50%, about 60%, about 70% or about 80% more tumor regression in the treated subject as compared to an untreated subject or a subject treated with a PD-1 inhibitor by a route of administration other than intralesional (e.g., a systemic route of administration such as intravenous infusion).

In certain embodiments, intralesionally administering to a subject with a skin cancer lesion and in need thereof a therapeutically effective amount of a PD-1 inhibitor (such as an anti-PD-1 antibody) leads to increased tumor regression, tumor shrinkage and/or disappearance. In one embodiment, the intralesional administration leads to tumor regression or tumor shrinkage such that a need for surgery is reduced or eliminated.

In certain embodiments, the intralesional administration of a PD-1 inhibitor leads to delay in tumor growth and development, e.g., tumor growth may be delayed by about 3 days, more than 3 days, about 7 days, more than 7 days, more than 15 days, more than 1 month, more than 3 months, more than 6 months, more than 1 year, more than 2 years, or more than 3 years in the treated subject as compared to an untreated subject or a subject treated with a PD-1 inhibitor by a route of administration other than intralesional (e.g., a systemic route of administration such as intravenous infusion).

In certain embodiments, intralesionally administering to a subject with a skin cancer lesion and in need thereof a therapeutically effective amount of a PD-1 inhibitor (such as an anti-PD-1 antibody) leads to reduced incidence of adverse events, reduced severity of adverse events, and/or reduced toxicity in the treated subject as compared to an untreated subject or a subject treated with a PD-1 inhibitor by a route of administration other than intralesional (e.g., a systemic route of administration such as intravenous infusion).

In certain embodiments, intralesionally administering to a subject with a skin cancer lesion and in need thereof a therapeutically effective amount of a PD-1 inhibitor (e.g., an anti-PD-1 antibody) prevents tumor recurrence and/or increases duration of survival of the subject, e.g., increases duration of survival by more than 15 days, more than 1 month, more than 3 months, more than 6 months, more than 12 months, more than 18 months, more than 24 months, more than 36 months, or more than 48 months as compared to an untreated subject or a subject treated with an anti-PD-1 antibody by a route of administration other than intralesional (e.g., by intravenous infusion).

In certain embodiments, intralesionally administering to a subject with a skin cancer lesion and in need thereof a therapeutically effective amount of a PD-1 inhibitor (such as an anti-PD-1 antibody) leads to complete disappearance of all evidence of tumor cells ("complete response"), leads to at least 30% or more decrease in tumor cells or tumor size ("partial response"), or leads to complete or partial disappearance of tumor cells/lesions including new measurable lesions. Tumor reduction can be measured by any methods known in the art, e.g., X-rays, positron emission tomography (PET), computed tomography (CT), magnetic resonance imaging (MRI), cytology, histology, or molecular genetic analyses.

In certain embodiments, intralesionally administering to a subject with a skin cancer lesion and in need thereof a therapeutically effective amount of a PD-1 inhibitor (such as an anti-PD-1 antibody) leads to increased overall survival (OS) or progression-free survival (PFS) of the subject as compared to a subject administered with a 'standard-of-care' (SOC) therapy (e.g., chemotherapy, surgery or radiation). In certain embodiments, the PFS is increased by at least one month, at least 2 months, at least 3 months, at least 4 months, at least 5 months, at least 6 months, at least 7 months, at least 8 months, at least 9 months, at least 10 months, at least 11 months, at least 1 year, at least 2 years, or at least 3 years as compared to a subject administered with any one or more SOC therapies. In certain embodiments, the OS is increased by at least one month, at least 2 months, at least 3 months, at least 4 months, at least 5 months, at least 6 months, at least 7 months, at least 8 months, at least 9 months, at least 10 months, at least 11 months, at least 1 year, at least 2 years, or at least 3 years as compared to a subject administered with any one or more SOC therapies.

In certain embodiments, intralesional administration of a therapeutically effective amount of a PD-1 inhibitor (e.g., an anti-PD-1 antibody) to a subject with skin cancer wherein the subject has received a transplant, such as a solid organ or tissue transplant, advantageously avoids adverse events associated with systemic administration of a PD-1 inhibitor to a transplant recipient. In such embodiments, intralesional administration to a transplant recipient subject leads to at least about 10%, about 20%, about 30%, about 40%, about 50%, about 60%, about 70%, about 80%, or about 90% lower incidence of adverse events as compared to a transplant recipient subject that receives the PD-1 inhibitor via another route—e.g., a systemic route of administration such as intravenous infusion. Non-limiting examples of adverse events that may be thus avoided in this patient population include allograft rejection and injury.

PD-1 Inhibitors

The methods disclosed herein include administering a therapeutically effective amount of a PD-1 inhibitor. As used herein, a "PD-1 inhibitor" refers to any molecule capable of inhibiting, blocking, abrogating or interfering with the activity or expression of PD-1. In some embodiments, the PD-1 inhibitor can be an antibody, a small molecule compound, a nucleic acid, a polypeptide, or a functional fragment or variant thereof. Non-limiting examples of suitable PD-1 inhibitor antibodies include anti-PD-1 antibodies and antigen-binding fragments thereof, anti-PD-L1 antibodies and antigen-binding fragments thereof, and anti-PD-L2 antibodies and antigen-binding fragments thereof. Other non-limiting examples of suitable PD-1 inhibitors include RNAi molecules such as anti-PD-1 RNAi molecules, anti-PD-L1 RNAi, and an anti-PD-L2 RNAi, antisense molecules such as anti-PD-1 antisense RNA, anti-PD-L1 antisense RNA, and anti-PD-L2 antisense RNA, and dominant negative proteins such as a dominant negative PD-1 protein, a dominant negative PD-L1 protein, and a dominant negative PD-L2 protein. Some examples of the foregoing PD-1 inhibitors are described in e.g., U.S. Pat. No. 9,308,236, U.S. Ser. No. 10/011,656, and US 20170290808, the portions of which that identify PD-1 inhibitors are hereby incorporated by reference.

As used herein, the term "antibody" refers to immunoglobulin molecules comprising four polypeptide chains, two heavy (H) chains and two light (L) chains inter-connected by disulfide bonds, as well as multimers thereof (e.g., IgM). In a typical antibody, each heavy chain comprises a heavy chain variable region (abbreviated herein as HCVR or $V_H$) and a heavy chain constant region. The heavy chain constant region comprises three domains, $C_H1$, $C_H2$ and $C_H3$. Each light chain comprises a light chain variable region (abbreviated herein as LCVR or $V_L$) and a light chain constant region. The light chain constant region comprises one domain ($C_L1$). The $V_H$ and $V_L$ regions can be further subdivided into regions of hypervariability, termed complementarity determining regions (CDRs), interspersed with regions that are more conserved, termed framework regions (FR). Each $V_H$ and $V_L$ is composed of three CDRs and four FRs, arranged from amino-terminus to carboxy-terminus in the following order: FR1, CDR1, FR2, CDR2, FR3, CDR3, FR4. In different embodiments of the invention, the FRs of the anti-IL-4R antibody (or antigen-binding portion thereof) may be identical to the human germline sequences, or may be naturally or artificially modified. An amino acid consensus sequence may be defined based on a side-by-side analysis of two or more CDRs. The term "antibody," as used herein, also includes antigen-binding fragments of full antibody molecules.

As used herein, the terms "antigen-binding portion" of an antibody, "antigen-binding fragment" of an antibody, and the like, include any naturally occurring, enzymatically obtainable, synthetic, or genetically engineered polypeptide or glycoprotein that specifically binds an antigen to form a complex. Antigen-binding fragments of an antibody may be derived, e.g., from full antibody molecules using any suitable standard techniques such as proteolytic digestion or recombinant genetic engineering techniques involving the manipulation and expression of DNA encoding antibody variable and optionally constant domains. Such DNA is known and/or is readily available from, e.g., commercial sources, DNA libraries (including, e.g., phage-antibody libraries), or can be synthesized. The DNA may be sequenced and manipulated chemically or by using molecular biology techniques, for example, to arrange one or more variable and/or constant domains into a suitable configuration, or to introduce codons, create cysteine residues, modify, add or delete amino acids, etc.

Non-limiting examples of antigen-binding fragments include: (i) Fab fragments; (ii) F(ab')2 fragments; (iii) Fd fragments; (iv) Fv fragments; (v) single-chain Fv (scFv) molecules; (vi) dAb fragments; and (vii) minimal recognition units consisting of the amino acid residues that mimic the hypervariable region of an antibody (e.g., an isolated complementarity determining region (CDR) such as a CDR3 peptide), or a constrained FR3-CDR3-FR4 peptide. Other engineered molecules, such as domain-specific antibodies, single domain antibodies, domain-deleted antibodies, chimeric antibodies, CDR-grafted antibodies, diabodies, triabodies, tetrabodies, minibodies, nanobodies (e.g. monovalent nanobodies, bivalent nanobodies, etc.), small modular immunopharmaceuticals (SMIPs), and shark variable IgNAR domains, are also encompassed within the expression "antigen-binding fragment," as used herein.

An antigen-binding fragment of an antibody will typically comprise at least one variable domain. The variable domain may be of any size or amino acid composition and will generally comprise at least one CDR which is adjacent to or in frame with one or more framework sequences. In antigen-binding fragments having a $V_H$ domain associated with a $V_L$ domain, the $V_H$ and $V_L$ domains may be situated relative to one another in any suitable arrangement. For example, the variable region may be dimeric and contain $V_H$-$V_H$, $V_H$-$V_L$ or $V_L$-$V_L$ dimers. Alternatively, the antigen-binding fragment of an antibody may contain a monomeric $V_H$ or $V_L$ domain.

In certain embodiments, an antigen-binding fragment of an antibody may contain at least one variable domain covalently linked to at least one constant domain. Non-limiting, exemplary configurations of variable and constant domains that may be found within an antigen-binding fragment of an antibody of the present disclosure include: (i) $V_H$-$C_H1$; (ii) $V_H$-$C_H2$; (iii) $V_H$-$C_H3$; (iv) $V_H$-$C_H1$-$C_H2$; (v) $V_H$-$C_H1$-$C_H2$-$C_H3$; (vi) $V_H$-$C_H2$-$C_H3$; (vii) $V_H$-$C_L$; $V_L$-$C_H1$; (ix) $V_L$-$C_H2$; (x) $V_L$-$C_H3$; (xi) $V_L$-$C_H1$-$C_H2$; (xii) $V_L$-$C_H1$-$C_H2$-$C_H3$; (xiii) $V_L$-$C_H2$-$C_H3$; and (xiv) $V_L$-$C_L$. In any configuration of variable and constant domains, including any of the exemplary configurations listed above, the variable and constant domains may be either directly linked to one another or may be linked by a full or partial hinge or linker region. A hinge region may consist of at least 2 (e.g., 5, 10, 15, 20, 40, 60 or more) amino acids which result in a flexible or semi-flexible linkage between adjacent variable and/or constant domains in a single polypeptide molecule. Moreover, an antigen-binding fragment of an antibody of the present disclosure may comprise a homo-dimer or hetero-dimer (or other multimer) of any of the variable and constant domain configurations listed above in non-covalent association with one another and/or with one or more monomeric $V_H$ or $V_L$ domain (e.g., by disulfide bond(s)).

The antibodies used in the methods disclosed herein may be human antibodies. As used herein, the term "human antibody" refers to antibodies having variable and constant regions derived from human germline immunoglobulin sequences. The human antibodies of the present disclosure may nonetheless include amino acid residues not encoded by human germline immunoglobulin sequences (e.g., mutations introduced by random or site-specific mutagenesis in vitro or by somatic mutation in vivo), for example in the CDRs and in particular CDR3. However, the term "human antibody," as used herein, is not intended to include antibodies in which CDR sequences derived from the germline of another mammalian species, such as a mouse, have been grafted onto human framework sequences.

The antibodies used in the methods disclosed herein may be recombinant human antibodies. As used herein, the term "recombinant human antibody" includes all human antibodies that are prepared, expressed, created or isolated by recombinant means, such as antibodies expressed using a recombinant expression vector transfected into a host cell (described further below), antibodies isolated from a recombinant, combinatorial human antibody library (described further below), antibodies isolated from an animal (e.g., a mouse) that is transgenic for human immunoglobulin genes [see e.g., Taylor et al. (1992) *Nucl. Acids Res.* 20:6287-6295] or antibodies prepared, expressed, created or isolated by any other means that involves splicing of human immunoglobulin gene sequences to other DNA sequences. Such recombinant human antibodies have variable and constant regions derived from human germline immunoglobulin sequences. In certain embodiments, however, such recombinant human antibodies are subjected to in vitro mutagenesis (or, when an animal transgenic for human Ig sequences is used, in vivo somatic mutagenesis) and thus the amino acid sequences of the $V_H$ and $V_L$ regions of the recombinant antibodies are sequences that, while derived from and related to human germline $V_H$ and $V_L$ sequences, may not naturally exist within the human antibody germline repertoire in vivo.

Anti-PD-1 Antibodies and Antigen-Binding Fragments Thereof

In some embodiments, PD-1 inhibitors used in the methods disclosed herein are antibodies or antigen-binding fragments thereof that specifically bind PD-1. The term "specifically binds," or the like, means that an antibody or antigen-binding fragment thereof forms a complex with an antigen that is relatively stable under physiologic conditions. Methods for determining whether an antibody specifically binds to an antigen are well known in the art and include, for example, equilibrium dialysis, surface plasmon resonance, and the like. For example, an antibody that "specifically binds" PD-1, as used in the context of the present disclosure, includes antibodies that bind PD-1 or a portion thereof with a $K_D$ of less than about 500 nM, less than about 300 nM, less than about 200 nM, less than about 100 nM, less than about 90 nM, less than about 80 nM, less than about 70 nM, less than about 60 nM, less than about 50 nM, less than about 40 nM, less than about 30 nM, less than about 20 nM, less than about 10 nM, less than about 5 nM, less than about 4 nM, less than about 3 nM, less than about 2 nM, less than about 1 nM or less than about 0.5 nM, as measured in a surface plasmon resonance assay. An isolated antibody that specifically binds human PD-1 may, however, have cross-reactivity to other antigens, such as PD-1 molecules from other (non-human) species.

According to certain exemplary embodiments, the anti-PD-1 antibody, or antigen-binding fragment thereof comprises a heavy chain variable region (HCVR), light chain variable region (LCVR), and/or complementarity determining regions (CDRs) comprising the amino acid sequences of any of the anti-PD-1 antibodies set forth in U.S. Pat. No. 9,987,500, which is hereby incorporated by reference in its entirety. In certain exemplary embodiments, the anti-PD-1 antibody or antigen-binding fragment thereof that can be used in the context of the present disclosure comprises the heavy chain complementarity determining regions (HCDRs) of a heavy chain variable region (HCVR) comprising the amino acid sequence of SEQ ID NO: 1 and the light chain complementarity determining regions (LCDRs) of a light chain variable region (LCVR) comprising the amino acid sequence of SEQ ID NO: 2. According to certain embodiments, the anti-PD-1 antibody or antigen-binding fragment thereof comprises three HCDRs (HCDR1, HCDR2 and HCDR3) and three LCDRs (LCDR1, LCDR2 and LCDR3), wherein the HCDR1 comprises the amino acid sequence of SEQ ID NO: 3; the HCDR2 comprises the amino acid sequence of SEQ ID NO: 4; the HCDR3 comprises the amino acid sequence of SEQ ID NO: 5; the LCDR1 comprises the amino acid sequence of SEQ ID NO: 6; the LCDR2 comprises the amino acid sequence of SEQ ID NO: 7; and the LCDR3 comprises the amino acid sequence of SEQ ID NO: 8. In yet other embodiments, the anti-PD-1 antibody or antigen-binding fragment thereof comprises an HCVR comprising SEQ ID NO: 1 and an LCVR comprising SEQ ID NO: 2. In certain embodiments, the methods of the present disclosure comprise the use of an anti-PD-1 antibody, wherein the antibody comprises a heavy chain comprising the amino acid sequence of SEQ ID NO: 9. In some embodiments, the anti-PD-1 antibody comprises a light chain comprising the amino acid sequence of SEQ ID NO: 10. An exemplary antibody comprising a heavy chain comprising the amino acid sequence of SEQ ID NO: 9 and a light chain comprising the amino acid sequence of SEQ ID NO: 10 is the fully human anti-PD-1 antibody known as cemiplimab (also known as REGN2810).

According to certain exemplary embodiments, the methods of the present disclosure comprise the use of REGN2810, or a bioequivalent thereof. As used herein, the term "bioequivalent" refers to anti-PD-1 antibodies or PD-1-binding proteins or fragments thereof that are pharmaceutical equivalents or pharmaceutical alternatives whose rate and/or extent of absorption do not show a significant difference with that of a reference antibody (e.g., REGN2810) when administered at the same molar dose under similar experimental conditions, either single dose or multiple dose. In the context of the present disclosure, the term "bioequivalent" includes antigen-binding proteins that bind to PD-1 and do not have clinically meaningful differences with REGN2810 with respect to safety, purity and/or potency.

According to certain embodiments of the present disclosure, the anti-human PD-1, or antigen-binding fragment thereof, comprises a HCVR having 90%, 95%, 98% or 99% sequence identity to SEQ ID NO: 1.

According to certain embodiments of the present disclosure, the anti-human PD-1, or antigen-binding fragment thereof, comprises a LCVR having 90%, 95%, 98% or 99% sequence identity to SEQ ID NO: 2.

According to certain embodiments of the present disclosure, the anti-human PD-1, or antigen-binding fragment thereof, comprises a HCVR comprising an amino acid sequence of SEQ ID NO: 1 having no more than 5 amino acid substitutions. According to certain embodiments of the present disclosure, the anti-human PD-1, or antigen-binding fragment thereof, comprises a LCVR comprising an amino acid sequence of SEQ ID NO: 2 having no more than 2 amino acid substitutions.

Sequence identity may be measured by methods known in the art (e.g., GAP, BESTFIT, and BLAST).

The present disclosure also includes use of anti-PD-1 antibodies in methods to treat skin cancer, wherein the anti-PD-1 antibodies comprise variants of any of the HCVR, LCVR and/or CDR amino acid sequences disclosed herein having one or more conservative amino acid substitutions. For example, the present disclosure includes use of anti-PD-1 antibodies having HCVR, LCVR and/or CDR amino acid sequences with, e.g., 10 or fewer, 8 or fewer, 6 or fewer, 4 or fewer, etc. conservative amino acid substitutions relative to any of the HCVR, LCVR and/or CDR amino acid sequences disclosed herein.

Other anti-PD-1 antibodies that can be used in the context of the methods of the present disclosure include, e.g., the antibodies referred to and known in the art as nivolumab, pembrolizumab, MED10608, pidilizumab, BI 754091, spartalizumab (also known as PDR001), camrelizumab (also known as SHR-1210), JNJ-63723283, MCLA-134, or any of the anti-PD-1 antibodies set forth in U.S. Pat. Nos. 6,808,710, 7,488,802, 8,008,449, 8,168,757, 8,354,509, 8,609,089, 8,686,119, 8,779,105, 8,900,587, and 9,987,500, and in patent publications WO2006/121168, WO2009/114335. The portions of all of the aforementioned publications that identify anti-PD-1 antibodies are hereby incorporated by reference.

The anti-PD-1 antibodies used in the context of the methods of the present disclosure may have pH-dependent binding characteristics. For example, an anti-PD-1 antibody for use in the methods of the present disclosure may exhibit reduced binding to PD-1 at acidic pH as compared to neutral pH. Alternatively, an anti-PD-1 antibody of the invention may exhibit enhanced binding to its antigen at acidic pH as compared to neutral pH. The expression "acidic pH" includes pH values less than about 6.2, e.g., about 6.0, 5.95, 5.9, 5.85, 5.8, 5.75, 5.7, 5.65, 5.6, 5.55, 5.5, 5.45, 5.4, 5.35, 5.3, 5.25, 5.2, 5.15, 5.1, 5.05, 5.0, or less. As used herein, the expression "neutral pH" means a pH of about 7.0 to about 7.4. The expression "neutral pH" includes pH values of about 7.0, 7.05, 7.1, 7.15, 7.2, 7.25, 7.3, 7.35, and 7.4.

In certain instances, "reduced binding to PD-1 at acidic pH as compared to neutral pH" is expressed in terms of a ratio of the $K_D$ value of the antibody binding to PD-1 at acidic pH to the $K_D$ value of the antibody binding to PD-1 at neutral pH (or vice versa). For example, an antibody or antigen-binding fragment thereof may be regarded as exhibiting "reduced binding to PD-1 at acidic pH as compared to neutral pH" for purposes of the present disclosure if the antibody or antigen-binding fragment thereof exhibits an acidic/neutral $K_D$ ratio of about 3.0 or greater. In certain exemplary embodiments, the acidic/neutral $K_D$ ratio for an antibody or antigen-binding fragment of the present disclosure can be about 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 20.0, 25.0, 30.0, 40.0, 50.0, 60.0, 70.0, 100.0, or greater.

Antibodies with pH-dependent binding characteristics may be obtained, e.g., by screening a population of antibodies for reduced (or enhanced) binding to a particular antigen at acidic pH as compared to neutral pH. Additionally, modifications of the antigen-binding domain at the amino acid level may yield antibodies with pH-dependent characteristics. For example, by substituting one or more amino acids of an antigen-binding domain (e.g., within a CDR) with a histidine residue, an antibody with reduced antigen-binding at acidic pH relative to neutral pH may be obtained. As used herein, the expression "acidic pH" means a pH of 6.0 or less.

Anti-PD-L1 Antibodies and Antigen-Binding Fragments Thereof

In some embodiments, PD-1 inhibitors used in the methods disclosed herein are antibodies or antigen-binding fragments thereof that specifically bind PD-L1. For example, an antibody that "specifically binds" PD-L1, as used in the context of the present disclosure, includes antibodies that bind PD-L1 or a portion thereof with a $K_D$ of about $1 \times 10^{-8}$ M or less (e.g., a smaller $K_D$ denotes a tighter binding). A "high affinity" anti-PD-L1 antibody refers to those mAbs having a binding affinity to PD-L1, expressed as $K_D$ of at least $10^{-8}$ M, preferably $10^{-9}$ M, more preferably $10^{-10}$ M, even more preferably $10^{-11}$ M, even more preferably $10^{-12}$ M, as measured by surface plasmon resonance, e.g., BIA-CORE™ or solution-affinity ELISA. An isolated antibody that specifically binds human PD-L1 may, however, have cross-reactivity to other antigens, such as PD-L1 molecules from other (non-human) species.

According to certain exemplary embodiments, the anti-PD-L1 antibody, or antigen-binding fragment thereof comprises a heavy chain variable region (HCVR), light chain variable region (LCVR), and/or complementarity determining regions (CDRs) comprising the amino acid sequences of any of the anti-PD-L1 antibodies set forth in U.S. Pat. No. 9,938,345, which is hereby incorporated by reference in its entirety. In certain exemplary embodiments, an anti-PD-L1 antibody or antigen-binding fragment thereof that can be used in the context of the present disclosure comprises the heavy chain complementarity determining regions (HCDRs) of a heavy chain variable region (HCVR) and the light chain complementarity determining regions (LCDRs) of a light chain variable region (LCVR), wherein the HCVR and LCVR comprise the amino acid sequences of the anti-PD-L1 antibody designated as H2M8314N in U.S. Pat. No. 9,938,345. According to certain embodiments, the anti-PD-L1 antibody or antigen-binding fragment thereof comprises three HCDRs (HCDR1, HCDR2 and HCDR3) and three LCDRs (LCDR1, LCDR2 and LCDR3), wherein the HCDR1, HCDR2, HCDR3, LCDR1, LCDR2 and LCDR3 comprise the amino acid sequences of the anti-PD-L1 antibody designated as H2M8314N in U.S. Pat. No. 9,938,345. In yet other embodiments, the anti-PD-L1 antibody or antigen-binding fragment thereof comprises an HCVR and an LCVR that comprise the amino acid sequences of the anti-PD-L1 antibody designated as H2M8314N in U.S. Pat. No. 9,938,345.

In certain embodiments, the methods of the present disclosure comprise the use of an anti-PD-L1 antibody, wherein the antibody comprises a heavy chain comprising the heavy chain amino acid sequence of the anti-PD-L1 antibody designated as H2M8314N in U.S. Pat. No. 9,938,345. In some embodiments, the anti-PD-1 antibody comprises a light chain comprising the light chain amino acid sequence of the anti-PD-L1 antibody designated as H2M8314N in U.S. Pat. No. 9,938,345.

According to certain embodiments of the present disclosure, the anti-human PD-L1, or antigen-binding fragment thereof, comprises a LCVR having 90%, 95%, 98% or 99% sequence identity to the LCVR amino acid sequence of the anti-PD-L1 antibody designated as H2M8314N in U.S. Pat. No. 9,938,345.

According to certain embodiments of the present disclosure, the anti-human PD-L1, or antigen-binding fragment thereof, comprises a HCVR comprising an amino acid sequence of the anti-PD-L1 antibody designated as H2M8314N in U.S. Pat. No. 9,938,345 having no more than 5 amino acid substitutions. According to certain embodiments of the present disclosure, the anti-human PD-L1, or antigen-binding fragment thereof, comprises a LCVR comprising an amino acid sequence of the anti-PD-L1 antibody designated as H2M8314N in U.S. Pat. No. 9,938,345 having no more than 2 amino acid substitutions.

Sequence identity may be measured by methods known in the art (e.g., GAP, BESTFIT, and BLAST).

The present disclosure also includes use of anti-PD-L1 antibodies in methods to treat skin cancer, wherein the anti-PD-L1 antibodies comprise variants of any of the HCVR, LCVR and/or CDR amino acid sequences disclosed herein having one or more conservative amino acid substitutions. For example, the present disclosure includes use of anti-PD-L1 antibodies having HCVR, LCVR and/or CDR amino acid sequences with, e.g., 10 or fewer, 8 or fewer, 6 or fewer, 4 or fewer, etc. conservative amino acid substitutions relative to any of the HCVR, LCVR and/or CDR amino acid sequences disclosed herein.

Other anti-PD-L1 antibodies that can be used in the context of the methods of the present disclosure include, e.g., the antibodies referred to and known in the art as MDX-1105, atezolizumab (TECENTRIQ™), durvalumab (IMFINZI™), avelumab (BAVENCIO™) LY3300054, FAZ053, STI-1014, CX-072, KN035 (Zhang et al., Cell Discovery, 3, 170004 (March 2017)), CK-301 (Gorelik et al., American Association for *Cancer* Research Annual Meeting (AACR), 2016-04-04 Abstract 4606), or any of the other anti-PD-L1 antibodies set forth in patent publications U.S. Pat. Nos. 7,943,743, 8,217,149, 9,402,899, 9,624,298, 9,938,345, WO 2007/005874, WO 2010/077634, WO 2013/181452, WO 2013/181634, WO 2016/149201, WO 2017/034916, or EP3177649. The portions of all of the aforementioned publications that identify anti-PD-L1 antibodies are hereby incorporated by reference.

Pharmaceutical Compositions and Administration

The PD-1 inhibitors disclosed herein may be included within a pharmaceutical composition, which may be formulated with suitable carriers, excipients, buffers, and other agents that provide suitable transfer, delivery, tolerance, and the like. A multitude of appropriate formulations can be found in the formulary known to all pharmaceutical chemists: Remington's Pharmaceutical Sciences, Mack Publishing Company, Easton, Pa. These formulations include, for example, powders, pastes, ointments, jellies, waxes, oils, lipids, lipid (cationic or anionic) containing vesicles (such as LIPOFECTIN™), DNA conjugates, anhydrous absorption pastes, oil-in-water and water-in-oil emulsions, emulsions carbowax (polyethylene glycols of various molecular weights), semi-solid gels, and semi-solid mixtures containing carbowax. See also Powell et al., "Compendium of excipients for parenteral formulations" PDA, *J Pharm Sci Technol* 52:238-311 (1998).

Various delivery systems are known and can be used to administer the pharmaceutical composition of the invention, e.g., encapsulation in liposomes, microparticles, microcapsules, recombinant cells capable of expressing the mutant viruses, receptor mediated endocytosis. See, e.g., Wu et al., *J. Biol. Chem.* 262: 4429-32 (1987).

A pharmaceutical composition comprising a PD-1 inhibitor disclosed herein is suitable for intralesional administration, which includes administration directly into a skin cancer lesion and administration into the skin overlying the skin cancer lesion. The pharmaceutical composition may be delivered by subcutaneous injection with a standard needle and syringe.

Injectable formulations of the pharmaceutical composition may be prepared by known methods. For example, the injectable formulation may be prepared, e.g., by dissolving, suspending or emulsifying the antibody or its salt described above in a sterile aqueous medium or an oily medium conventionally used for injections. As the aqueous medium for injections, there are, for example, physiological saline, an isotonic solution containing glucose and other auxiliary agents, etc., which may be used in combination with an appropriate solubilizing agent such as an alcohol (e.g., ethanol), a polyalcohol (e.g., propylene glycol, polyethylene glycol), a nonionic surfactant [e.g., polysorbate 80, HCO-50 (polyoxyethylene (50 mol) adduct of hydrogenated castor oil)], etc. As the oily medium, there are employed, e.g., sesame oil, soybean oil, etc., which may be used in combination with a solubilizing agent such as benzyl benzoate, benzyl alcohol, etc. The injectable formulation thus prepared is preferably filled in an appropriate injection ampoule. In some embodiments, an injectable formulation may be in the form of an intralesional injection solution that includes a concentration of PD-1 inhibitor and one or more solvents (e.g., distilled water, saline, etc.).

In certain embodiments, the present disclosure provides a pharmaceutical composition or formulation comprising a therapeutic amount of a PD-1 inhibitor (such as an anti-PD-1 antibody) and a pharmaceutically acceptable carrier. In certain embodiments, the present disclosure provides for a PD-1 inhibitor (such as an anti-PD-1 antibody) formulated in a pharmaceutical composition for administration by intralesional injection.

Exemplary pharmaceutical compositions comprising an anti-PD-1 antibody that can be used in the context of the present disclosure are disclosed, e.g., in US 2019/0040137.

Administration Regimens

In certain embodiments, the methods disclosed herein include intralesionally administering to the tumor of a subject in need thereof a therapeutically effective amount of a PD-1 inhibitor (such as an anti-PD-1 antibody) in multiple doses, e.g., as part of a specific therapeutic dosing regimen. For example, the above-mentioned therapeutic dosing regimen may comprise administering one or more doses of a PD-1 inhibitor to the subject at a frequency of about once a day, once every two days, once every three days, once every four days, once every five days, once every six days, once a week, once every two weeks, once every three weeks, once every four weeks, once every five weeks, once every six weeks, once every eight weeks, once every twelve weeks, once a month, once every two months, once every three months, once every four months, twice a day, twice every two days, twice every three days, twice every four days, twice every five days, twice every six days, twice a week, twice every two weeks, twice every three weeks, twice every four weeks, twice every five weeks, twice every six weeks, twice every eight weeks, twice every twelve weeks, twice a month, twice every two months, twice every three months, twice every four months, three times a day, three times every two days, three times every three days, three times every four days, three times every five days, three times every six days, three times a week, three times every two weeks, three times every three weeks, three times every four weeks, three times every five weeks, three times every six weeks, three times every eight weeks, three times every twelve weeks, three times a month, three times every two months, three times every three months, three times every four months or less frequently or as needed so long as a therapeutic response is achieved. In one embodiment, one or more doses of an anti-PD-1 antibody are administered once a week.

In certain embodiments, the one or more doses are administered in at least one treatment cycle. The methods, according to this aspect, comprise administering to a subject in need thereof at least one treatment cycle comprising administration of 1, 2, 3, 4, 5, 6, 7, 8, 9, 10 or more doses of a PD-1 inhibitor (such as an anti-PD-1 antibody). In one embodiment, a treatment cycle comprises 3 doses of a PD-1 inhibitor. In one embodiment, a treatment cycle comprises 12 doses of a PD-1 inhibitor. In one embodiment, a treatment cycle comprises 24 doses of a PD-1 inhibitor. In one embodiment, a treatment cycle comprises 3 doses of a PD-1 inhibitor, each dose administered two weeks after the immediately preceding dose. In one embodiment, a treatment cycle comprises 10 doses of the PD-1 inhibitor, each dose administered one week after the immediately preceding dose. In one embodiment, a treatment cycle comprises 12 doses of the PD-1 inhibitor, each dose administered one week after the immediately preceding dose.

In one embodiment, all doses administered in a treatment cycle comprise the same amount of the PD-1 inhibitor. In another embodiment, a treatment cycle comprises administration of at least two doses that comprise different amounts of the PD-1 inhibitor. In one embodiment, the first dose in the treatment cycle comprises a larger amount of the PD-1 inhibitor than the subsequent doses in the treatment cycle. In one embodiment, the first dose in the treatment cycle comprises a smaller amount of the PD-1 inhibitor than the subsequent doses in the treatment cycle.

In one embodiment, the treatment cycle is repeated. In some embodiments, the treatment cycle is repeated 1, 2, 3, 4, 5, 6, 7, 8, 9, 10, 11, 12, or more times.

In certain embodiments, a dose of a PD-1 inhibitor is administered to a subject in a single session or patient visit. In certain embodiments, administration of a dose includes intralesionally administering one or more injections of a PD-1 inhibitor (such as an anti-PD-1 antibody) into one or more locations of the tumor lesion. Some or all of the locations of the tumor lesion may be the same or different from each other. In one embodiment, administration of a dose includes administering 1, 2, 3, 4, 5, 6, 7, 8, 9, 10 or more injections of a PD-1 inhibitor (such as an anti-PD-1 antibody) into 1, 2, 3, 4, 5, 6, or 7 locations of a tumor lesion. In one embodiment, 2 to 5 injections of a PD-1 inhibitor (such as an anti-PD-1 antibody) are administered into 2 to 5 locations of the tumor lesion of the subject. In some embodiments, the tumor lesion location includes, but is not limited to, the superior (cephalad) half of the lesion, the most dense portion of the top half of the lesion, the skin overlying the tumor lesion, and/or the superior (cephalad) periphery of the tumor near or adjacent an interface with normal-appearing skin.

In some embodiments, administration of a dose comprising intralesional administration of 1, 2, 3, 4, 5, 6, 7, 8, 9, 10 or more injections of a PD-1 inhibitor (such as an anti-PD-1 antibody) is completed in less than 10 minutes, such as 1 to 6 minutes, 2 to 5 minutes, or 2 to 3 minutes, as measured from the start of the first administered injection comprised in the dose to the end of the last administered injection comprised in the dose. For example, in one non-limiting, exemplary embodiment, the total time for intralesionally administering the PD-1 inhibitor (such as an anti-PD-1 antibody), measured from the start of the first administration to the end of the last administration, is about 2 to 5 minutes. In certain embodiments, one or more injections of a PD-1 inhibitor (such as an anti-PD-1 antibody) are intralesionally administered to a subject in need thereof over a time period of 1, 2, 3, 4, 5, 6, 7, 8, 9, or 10 minutes.

As used herein, the terms "initial," "secondary," "tertiary," and so on refer to the temporal sequence of administration. Thus, an "initial dose" is a dose that is administered at the beginning of the treatment regimen (also referred to as a "baseline dose"); a "secondary dose" is a dose administered after the initial dose; and a "tertiary dose" is a dose administered after the secondary dose. The initial, secondary, and tertiary doses may all contain the same amount of the PD-1 inhibitor (anti-PD-1 antibody). In certain embodiments, however, the amount contained in the initial, secondary and/or tertiary doses varies from one another (e.g., adjusted up or down as appropriate) during the course of treatment. In certain embodiments, one or more (e.g., 1, 2, 3, 4, or 5) doses are administered at the beginning of the treatment regimen as "loading doses" followed by subsequent doses that are administered on a less frequent basis (e.g., "maintenance doses"). For example, an anti-PD-1 antibody may be administered to a patient with a cancer at a loading dose of about 1 mg/kg to about 3 mg/kg followed by one or more maintenance doses of about 0.1 mg/kg to about 20 mg/kg of the patient's body weight.

In one exemplary embodiment of the present disclosure, each secondary and/or tertiary dose is administered ½ to 4 weeks or more (e.g., ½, 1, 1½, 2, 2½, 3, 3½, 4, or more weeks) after the immediately preceding dose. The phrase "the immediately preceding dose," as used herein, means, in a sequence of multiple administrations, the dose of anti-PD-1 antibody administered to a subject prior to administration of the next dose in the sequence with no intervening doses.

Similarly, an "initial treatment cycle" is a treatment cycle that is administered at the beginning of the treatment regimen; a "secondary treatment cycle" is a treatment cycle administered after the initial treatment cycle; and a "tertiary treatment cycle" is a treatment cycle administered after the secondary treatment cycle. In the context of the present disclosure, treatment cycles may be the same or different from each other.

Dosage

In certain embodiments, each dose of the PD-1 inhibitor comprises 0.1, 1, 0.3, 3, 4, 5, 6, 7, 8, 9 or 10 mg/kg of the patient's body weight. In certain embodiments, each dose comprises 5-500 mg of the PD-1 inhibitor, for example 5, 10, 15, 20, 25, 40, 45, 50, 60, 70, 80, 90, 100 mg or more of the PD-1 inhibitor. In one embodiment, the PD-1 inhibitor is REGN2810 (cemiplimab).

The amount of PD-1 inhibitor intralesionally administered to a subject according to the methods disclosed herein is, generally, a therapeutically effective amount. As used herein, the term "therapeutically effective amount" means an amount of a PD-1 inhibitor that results in one or more of: (a) a reduction in the severity or duration of a symptom or an indication of a skin cancer—e.g., a tumor lesion; (b) inhibition of tumor growth, or an increase in tumor necrosis, tumor shrinkage and/or tumor disappearance; (c) delay in tumor growth and development; (d) inhibition of tumor metastasis; (e) prevention of recurrence of tumor growth; (f) increase in survival of a subject with a cancer; and/or (g) a reduction in the use or need for conventional anti-cancer therapy (e.g., elimination of need for surgery or reduced or eliminated use of chemotherapeutic or cytotoxic agents) as compared to an untreated subject or a subject treated with a PD-1 inhibitor by a route of administration other than intralesional (e.g., by intravenous infusion).

In the case of a PD-1 inhibitor (e.g., an anti-PD-1 antibody), a therapeutically effective amount can be from about 5 mg to about 500 mg, from about 10 mg to about 450 mg, from about 50 mg to about 400 mg, from about 75 mg to about 350 mg, or from about 100 mg to about 300 mg of the antibody. For example, in various embodiments, the amount of the PD-1 inhibitor is about 5 mg, about 10 mg, about 15 mg, about 20 mg, about 30 mg, about 40 mg, about 50 mg, about 60 mg, about 70 mg, about 80 mg, about 90 mg, about 100 mg, about 110 mg, about 120 mg, about 130 mg, about 140 mg, about 150 mg, about 160 mg, about 170 mg, about 180 mg, about 190 mg, about 200 mg, about 210 mg, about 220 mg, about 230 mg, about 240 mg, about 250 mg, about 260 mg, about 270 mg, about 280 mg, about 290 mg, about 300 mg, about 310 mg, about 320 mg, about 330 mg, about 340 mg, about 350 mg, about 360 mg, about 370 mg, about 380 mg, about 390 mg, about 400 mg, about 410 mg, about 420 mg, about 430 mg, about 440 mg, about 450 mg, about 460 mg, about 470 mg, about 480 mg, about 490 mg, about 500 mg, about 510 mg, about 520 mg, about 530 mg, about 540 mg, about 550 mg, about 560 mg, about 570 mg, about 580 mg, about 590 mg, or about 600 mg, of the PD-1 inhibitor.

In one embodiment, a therapeutically effective amount of 5 mg of a PD-1 inhibitor (e.g., an anti-PD-1 antibody) is intralesionally administered according to the methods disclosed herein. In another embodiment, therapeutically effective amount of 15 mg of a PD-1 inhibitor (e.g., an anti-PD-1 antibody) is intralesionally administered according to the methods disclosed herein. In another embodiment, therapeutically effective amount of 44 mg of a PD-1 inhibitor (e.g., an anti-PD-1 antibody) is intralesionally administered according to the methods disclosed herein.

The amount of a PD-1 inhibitor contained within an individual dose may be expressed in terms of milligrams of antibody per kilogram of subject body weight (i.e., mg/kg). In certain embodiments, the PD-1 inhibitor used in the methods disclosed herein may be administered to a subject at a dose of about 0.0001 to about 100 mg/kg of subject body weight. In certain embodiments, an anti-PD-1 antibody may be administered at dose of about 0.1 mg/kg to about 20 mg/kg of a patient's body weight. In certain embodiments, the methods of the present disclosure comprise administration of a PD-1 inhibitor (e.g., an anti-PD-1 antibody) at a dose of about 1 mg/kg, 3 mg/kg, 5 mg/kg or 10 mg/kg of a patient's body weight.

In certain embodiments, an individual dose amount of a PD-1 inhibitor (e.g., an anti-PD-1 antibody) intralesionally administered to a patient may be less than a therapeutically effective amount, i.e., a subtherapeutic dose. For example, if the therapeutically effective amount of a PD-1 inhibitor comprises 3 mg/kg, a subtherapeutic dose comprises an amount less than 3 mg/kg, e.g., 2 mg/kg, 1.5 mg/kg, 1 mg/kg, 0.5 mg/kg or 0.3 mg/kg. As defined herein, a "subtherapeutic dose" refers to an amount of the PD-1 inhibitor that does not lead to a therapeutic effect by itself. However, in certain embodiments, multiple subtherapeutic doses of a PD-1 inhibitor are administered to collectively achieve a therapeutic effect in the subject.

In certain embodiments, each dose comprises 0.1-10 mg/kg (e.g., 0.3 mg/kg, 1 mg/kg, 3 mg/kg, or 10 mg/kg) of the subject's body weight. In certain other embodiments, each dose comprises 5-600 mg of the PD-1 inhibitor (such as an anti-PD-1 antibody), e.g., 5 mg, 10 mg, 15 mg, 20 mg, 25 mg, 30 mg, 40 mg, 45 mg, 50 mg, 100 mg, 150 mg, 200 mg, 250 mg, 300 mg, 350 mg, 400 mg, or 500 mg of the PD-1 inhibitor.

EXAMPLES

The disclosed technology is next described by means of the following examples. The use of these and other examples anywhere in the specification is illustrative only, and in no way limits the scope and meaning of the invention or of any exemplified form. Likewise, the invention is not limited to any particular preferred embodiments described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled. Also, while efforts have been made to ensure accuracy with respect to numbers used (e.g., amounts, temperature, etc.), some experimental errors and deviations should be accounted for. Unless indicated otherwise, parts are parts by weight, molecular weight is average molecular weight, temperature is in degrees Centigrade, and pressure is at or near atmospheric.

Example 1: Clinical Trial of Anti-PD-1 Antibody Administered Intralesionally in Patients with Recurrent Cutaneous Squamous Cell Carcinoma (CSCC)

This study is a phase 1, single-arm, open-label, dose-escalation study (with cohort expansions) to evaluate the safety, tolerability, pharmacokinetics (PK), and antitumor efficacy of weekly intralesional injections of an anti-PD-1 antibody in patients with resectable CSCC, a highly immune-responsive tumor type.

The exemplary anti-PD-1 antibody used in this study is REGN2810 (also known as cemiplimab, or H4H7798N as disclosed in U.S. Pat. No. 9,987,500), which is a fully human monoclonal anti-PD-1 antibody comprising a heavy chain comprising the amino acid sequence of SEQ ID NO: 9 and a light chain comprising the amino acid sequence of SEQ ID NO: 10; an HCVR/LCVR amino acid sequence pair comprising SEQ ID NOs: 1/2; and heavy and light chain CDR sequences comprising SEQ ID NOs: 3-8.

Study Objectives

A primary objective of the study is to characterize the safety and tolerability of REGN2810 injected intralesionally in patients with recurrent CSCC.

Secondary objectives of the study include: (1) to describe the objective response rate (ORR) in CSCC index lesions following intralesional injections of REGN2810; (2) to describe the pathologic complete response (CR) rate in CSCC index lesions following intralesional injections of REGN2810; (3) to describe the major pathologic response rate in CSCC index lesions following intralesional injections of REGN2810; (4) to evaluate systemic exposure of REGN2810 following intralesional injections of REGN2810; (5) to assess immunogenicity of REGN2810; and (6) to assess the dose of REGN2810.

Study Duration

The duration of the study for each patient is approximately 7 months, including the screening (28 days), treatment period (12 weeks), surgical resection at the end of treatment visit (week 13), and a 90 day post-treatment follow-up period. (See FIG. 1). The study contains an option for extended treatment (up to 12 additional weeks) on an individual patient basis when treatment beyond 12 weeks is clinically appropriate. The end of the study is defined as the last visit of the last patient.

In this study, it is expected that after intralesional administration, maximal REGN2810 concentrations in serum will appear more than 24 hours after the intralesional dose, requiring sampling beyond day 1 to obtain a complete PK profile. Samples for the analysis of drug concentration will be collected from all patients at pre-dose and at several time points after the first dose. This sampling schedule will facilitate the determination of the concentration-time profile after the last dose throughout the follow-up period (to describe the elimination of REGN2810).

Study Population

This study evaluates intralesional REGN2810 in patients with CSCC for which surgical removal is planned, but for whom the risk of recurrence is high due to prior history of recurrences after surgery. One of the benefits of intralesional REGN2810 is reduced risk of subsequent recurrences due to the ability of PD-1 inhibition to induce immune memory against CSCC.

The study population includes male and female patients 18 years or older at the time of consent who have recurrent CSCC and have at least 1 resectable lesion that is ≥1.0 cm and ≤2.0 cm. The lesion that is injected with REGN2810 is called the "index lesion."

Inclusion Criteria: A patient must meet the following criteria to be eligible for inclusion in the study: (1) history of recurrent resectable CSCC that satisfies either of the following conditions: (a) at least 1 prior CSCC in the head and neck that was surgically removed within 3 years prior to date of consent, now with a recurrent CSCC in the head and neck area that will be the index lesion for the study and is ≥1.0 cm and ≤2.0 cm (longest diameter); (b) at least 2 prior CSCCs of trunk or extremity that were surgically removed within 3 years prior to date of consent, now with a recurrent CSCC of trunk or extremity that will be the index lesion for the study (any anatomic location) and is ≥1.0 cm and ≤2.0 cm (longest diameter); (2) measurable disease (i.e., at least 1 lesion that is at least 1 cm in both of the longest perpendicular diameters) in the index lesion; (3) Eastern Cooperative Oncology Group (ECOG) performance status 1 (Oken et al., Am J Clin Oncol 1982; 5(6):649-55); (4) ≥18 years old; (5) Hepatic function: (a) total bilirubin ≤1.5×0 upper limit of normal (ULN), (b) alanine aminotransferase (ALT)≤3×ULN, (c) aspartate aminotransferase (AST)≤3× ULN, (c) alkaline phosphatase (ALP)≤2.5×ULN; (6) Renal function: serum creatinine ≤1.5×ULN or estimated creatinine clearance (CrCl)>30 mL/min; (7) Bone marrow function: (a) hemoglobin ≥9.0 g/dL, (b) absolute neutrophil count (ANC)≥1.5×10$^9$/L, (c) platelet count ≥75×10$^9$/L; (8) willing and able to comply with clinic visits and study-related procedures; (9) provide informed consent signed and dated by study patient.

Exclusion Criteria: A patient who meets any of the following criteria will be excluded from the study: (1) ongoing or recent (within 5 years) evidence of significant autoimmune disease that required treatment with systemic immunosuppressive treatments, which may suggest risk for irAEs (not exclusionary: vitiligo, childhood asthma that has resolved, type 1 diabetes, residual hypothyroidism that required only hormone replacement, or psoriasis that does not require systemic treatment); (2) prior treatment with an agent that blocks the PD-1/PD-L1 pathway; (3) prior treatment with other systemic immune modulating agent that was: (a) within fewer than 4 weeks (28 days) of the enrollment date, (b) associated with irAEs that were ≥ grade 1 within 90 days prior to enrollment, or (c) associated with toxicity that resulted in discontinuation of the immune-modulating agent; (4) known history of brain metastasis(es) from CSCC; (5) immunosuppressive corticosteroid doses (>10 mg prednisone daily or equivalent) within 4 weeks prior to the first dose of REGN2810 (not excluded: patients who require brief course of steroids); (6) history of non-infectious pneumonitis within the last 5 years; (7) any anticancer treatment, investigational or standard of care, within 30 days of the initial administration of REGN2810 or planned to occur during the study period (not excluded: patients receiving bisphosphonates or denosumab; surgery within 30 days of planned initial treatment of REGN2810); (8) history of documented allergic reactions or acute hypersensitivity reaction attributed to antibody treatments; (9) uncontrolled infection with human immunodeficiency virus (HIV) (detectable viral load or CD4 count below 350 irrespective of antiviral treatment), hepatitis B (HBsAg +, who have serum hepatitis B virus detectable by DNA polymerase chain reaction [PCR] irrespective of anti-viral therapy for hepatitis B), or hepatitis C infection (hepatitis C virus antibody positive [HCV Ab +] who have detectable HCV RNA by PCR); or other uncontrolled infection; (10) concurrent malignancy other than CSCC and/or history of malignancy other than CSCC within 3 years of date of first planned dose of REGN2810, except for tumors with negligible risk of metastasis or death, such as adequately treated BCC of the skin, carcinoma in situ of the cervix, or ductal carcinoma in situ of the breast, or low-risk early stage prostate adenocarcinoma (T1-T2aN0M0 and Gleason score ≤6 and PSA≤10 ng/mL) for which the management plan is active surveillance, or prostate adenocarcinoma with biochemical-only recurrence with documented PSA doubling time of >12 months for which the management plan is active surveillance (D'Amico et al., JAMA 2005; 294(4):440-7) (Pham et al., J Urol 2016; 196(2):392-8); (11) acute or chronic psychiatric problems that make the patient ineligible for participation; (12) patients with a history of solid organ transplant; (13) medical co-morbidity, physical examination finding, or metabolic dysfunction, or clinical laboratory abnormality that renders the patient unsuitable for participation in a clinical trial due to high safety risks and/or potential to affect interpretation of results of the study; (14) M1 or N1, N2 (a, b, or c), or N3 CSCC. Patients with history of metastatic CSCC (distant or nodal), are excluded unless the disease-free interval is at least 3 years; (15) patient excluded if the index lesion would be in dry red lip (vermillion), oral cavity, nasal mucosa, or anogenital area; (16) Patients on coumadin (warfarin), due to potential increased bleeding risk associated with surgery for patients on coumadin; (17) patient with an index lesion or a non-index lesion greater than 2.0 cm in diameter that cannot be surgically removed during the screening period; (18) pregnant or breastfeeding women; (19) sexually active men and women of childbearing potential who are unwilling to practice highly effective contraception prior to the initial dose/start of the first treatment, during the study, and for at least 6 months after the last dose.

Study Variables

Primary endpoints for this study include: the incidence, nature, and severity of dose limiting toxicities (DLTs), if any, and treatment-emergent adverse events (TEAEs), graded according to the National Cancer Institute-Common Terminology Criteria for Adverse Events (NCI CTCAE) v5, from the first dose through day 28; the incidence and severity of TEAEs, graded according to the NCI CTCAE v5, during the treatment period and up to 90 days after the last dose; and the incidence and severity of Injection Site Reactions (ISRs) from the first dose to 90 days after the last dose.

Secondary endpoints for this study include: ORR, determined using modified WHO criteria (described below) at the end of treatment (day 85 for patients who complete planned 12-week treatment course); pathologic complete response rate at time of surgery; major pathologic response rate at time of surgery (or end of treatment biopsies, for patients who decline surgery); REGN2810 concentration in serum over time from the first dose up to 90 days after the last dose; incidence of anti-drug antibody (ADA) titers for REGN2810; and selection of the recommended dose of REGN2810 for further study based on clinical and PK observations.

Additional endpoints for this study include: ORR, in non-index lesions determined using the modified WHO criteria at the end of treatment (day 85 for patients who complete planned 12-week treatment course).

Efficacy variables for this study include: pathologic CR, evaluated by surgical removal of the treated area at the end of treatment and defined as the histologic confirmation of no residual malignancy in tissue from surgical resection; major pathologic response, defined as histologic confirmation of no more than 10% of viable tumor cells from resection (or no residual malignancy in punch biopsies or patients who do not undergo surgery); and ORR, defined as the percentage of participants with partial response (PR) or complete response (CR) based on bi-dimensional measurements of the lesion on digital medical photographs according to the modified WHO criteria.

PK variables for this study include REGN2810 concentrations in serum over time. ADA variables for this study include ADA status, titer, and time point/visit.

Study Design

In this study, each patient receives once weekly (QW) 250 µL intralesional injections of REGN2810 at the assigned dose level for 12 weeks prior to scheduled surgery. Three dose cohorts follow a 3+3 dose-escalation design. FIG. 1 provides a general study flow diagram. Approximately 36 patients will be enrolled in the study, including 6 patients per dose level per 3+3 design.

The three dose cohorts of REGN2810 are administered intralesionally QW at the following dose levels: planned dose level 1 (starting dose) is 5 mg per week; planned dose level 2 is 15 mg per week; and planned dose level 3 is approximately 44 mg (43.75 mg) per week. The injection volume of 250 µl is constant at each dose level. Dose Levels are achieved by diluting REGN2810 (provided as a liquid in sterile, single-use vials at a concentration of 175 mg/ml) in buffer.

Procedures and Assessments

Screening Procedures include: informed consent, inclusion/exclusion, medical history, demographics, viral serology, coagulation, urinalysis, local pathological confirmation of CSCC, ECOG, chest x-ray, treatment assignment.

Treatment Procedure is intralesional REGN2810 administration.

Efficacy Procedures include: digital medical photography and surgical resection.

Safety Procedures include: assessment of vital signs, physical examination, electrocardiogram (ECG), adverse event (AE) monitoring, concomitant medications and procedures.

Laboratory Testing Procedures include: hematology, blood chemistry, pregnancy test (women only), thyroid function tests.

PK/drug concentrations: PK samples will be collected for assessment of REGN2810 concentrations in serum.

ADA: Serum samples will be collected for the assessments of Immunogenicity to REGN2810.

Concomitant Medications and Procedures

Prohibited Medications and Procedures: While participating in the study, a patient may not receive any of the following from the time of informed consent to the end of the follow-up period, unless otherwise specified below: (a) Standard or investigational agent for treatment of a tumor other than REGN2810, with the exception of the permitted medications listed below, (b) Agents that block the PD-1/PD-L1 pathways, (c) Non-study related surgical procedures, unless emergent or unless approval is granted, (d) Radiation Therapy.

Permitted Medications and Procedures: the following medications and procedures are permitted, under the following conditions: (a) any medication required to treat an AE and/or irAE, including systemic corticosteroids, (b) systemic corticosteroids for physiologic replacement (even if >10 mg/day prednisone equivalents), (c) a brief course of corticosteroids for prophylaxis or for treatment of non-autoimmune conditions, (d) bisphosphonates and denosumab, (e) physiologic replacement doses of systemic corticosteroids, even if >10 mg/day prednisone equivalents, (f) oral contraceptives, hormone-replacement therapy, or other maintenance therapy may continue, (g) acetaminophen at doses g/day, (h) surgical resection of non-index lesions, if clinically indicated, (i) other medications and procedures may be permitted on an individual basis.

Intralesional Administration of REGN2810

The index lesion (lesion selected for injection) will have a surface diameter of at least 1 cm on) the skin surface (max. diameter, 2.0 cm). Intralesional administration of REGN2810 is performed under direct visualization. No radiologic guidance (i.e., ultrasound) is used. The following lesion types are not selected for injection: friable or necrotic lesions, lesions that are hemorrhagic, lesions within 2.0 cm of the eye, or anogenital lesions. The index lesion should be cleaned with alcohol or betadine. At least 5 minutes (but not more than 30 minutes) prior to the planned REGN2810 injection, topical lidocaine ointment may be applied to the index lesion. The 250 µL REGN2810 treatment may be delivered with a ≤1 ml syringe, preferably with a 30-gauge needle.

REGN2810 is injected tangentially into the superior (cephalad) half of the index lesion at 2 to 5 locations. The inferior half of the index lesion is not injected to minimize loss of drug product from the lesion due to leakage from the inferior portion of the tumor. At least 1 injection should be administered intradermally in the skin overlying tumor (or within the most dense portion of the top half of the tumor), and at least 1 injection should be administered at the superior (cephalad) periphery of the tumor near the interface with normal-appearing skin. The total injection time for all injections should be 2 to 3 minutes. The injection should be administered very slowly to avoid leakage of study drug from the injected tissue. Loose or friable areas of tumor should not be injected due to potential leakage of study drug.

30±10 minutes after the injection, the lesion is inspected for any signs of ISR. Vital signs are recorded 30±10 minutes after the injection, and the index lesion is covered with non-occlusive dressing.

Management of Systemic Hypersensitivity Reactions (SHRs)

SHRs are defined as follows: typical symptoms may include fever, chills, rigors, skin flushing, dyspnea, back pain, abdominal pain, and nausea; reaction usually occur either during the injection or at any time until the end of the following day (in the absence of an alternative explanation); vital signs may be notable for hypotension and/or tachycardia.

For patients who experience Grade 1 or 2 SHRs (see Table 1), the following prophylactic medications are recommended at least 30 minutes prior to subsequent REGN2810 injections: diphenhydramine 50 mg (or equivalent) and/or acetaminophen/paracetamol 325 mg to 1000 mg. For patients who experience Grade 2 SHRs, corticosteroids (up to 25 mg of hydrocortisone or equivalent) may be used.

TABLE 1

Grading system for AEs not listed in NCI-CTCAE

| Grade | Severity | Description |
|---|---|---|
| 1 | Mild | Asymptomatic or mild symptoms; clinical or diagnostic observations only; intervention not indicated. |
| 2 | Moderate | Minimal, local or noninvasive intervention indicated; limiting age-appropriate instrumental ADL*. |
| 3 | Severe | Severe or medically significant but not immediately life-threatening; hospitalization or prolongation of hospitalization indicated; disabling; limiting self-care ADL**. |
| 4 | Life-threatening | Life-threatening consequences; urgent intervention indicated. |
| 5 | Death | Death related to AE |

*Instrumental Activities of Daily Living (ADL) refer to preparing meals, shopping for groceries or clothes, using the telephone, managing money, etc.
**Self-care ADL refer to bathing, dressing and undressing, feeding self, using the toilet, taking medications, and not bedridden.

Management of Injection Site Reactions (ISRs)

ISRs are defined as inflammation in or damage to the tissue surrounding where the study drug was injected.

For patients who experience Grade 1 or 2 ISRs (see Table 2), the following prophylactic medications are recommended at least 30 minutes prior to subsequent REGN2810 injections: diphenhydramine 50 mg (or equivalent) and/or acetaminophen/paracetamol 325 mg to 1000 mg.

TABLE 2

Severity criteria for ISRs

| Grade | Severity | Description |
|---|---|---|
| 1 | Mild | Mildly increased erythema, pruritis, erosion, excoriation, flaking, and/or tenderness |
| 2 | Moderate | Moderately increased erythema, pruritis, ulceration, excoriation, necrosis, and/or pain |
| 3 | Severe | Severe pain, ulceration, and/or necrosis |

Modified WHO Criteria

The externally visible component of target lesion(s) will be measured using bi-dimensional WHO criteria as the sum of the products (of individual target lesions) in the longest dimension and perpendicular second longest dimension—at each tumor assessment and will be documented using standardized digital photography. In the absence of substantial change in lesion geometry, subsequent visit measurements should be performed in the same axes and the previous visit's annotated photographs should be referred to as a starting point to identify the axis for measurement when making subsequent assessments.

Clinical response criteria for externally visible tumor(s) require bi-dimensional measurements according to WHO criteria, and are as follows: (a) Complete response of externally visible disease (vCR): all target lesion(s) no longer visible, maintained for at least 4 weeks, (b) Partial response of externally visible disease (vPR): decrease of 50% (WHO criteria) or greater in the sum the products of perpendicular longest dimensions of target lesion(s), maintained for at least 4 weeks, (c) Stable externally visible disease (vSD): not meeting criteria for vCR, vPR, or progressive disease, (d) Progression of visible disease (vPD): increase of ≥25% (WHO criteria) in the sum of the products of perpendicular longest dimensions of target lesion(s).

New Lesions: A new cutaneous lesion consistent with CSCC will be considered as clinical progression of disease (cPD) if the lesion is ≥10 mm in both maximal perpendicular diameters and was not previously present, unless it is confirmed on biopsy not to be consistent with CSCC.

Results

It is expected that intralesional administration of REGN2810 leads to enhanced tumor regression as well as increased safety in patients with CSCC. CSCC patients treated with intralesional administration of REGN2810 are expected to exhibit significantly reduced or zero incidence of adverse events and/or toxicity due to the use of localized treatment rather than systemic exposure of REGN2810. Intralesional administration of REGN2810 is also expected to induce immunological memory, and thus reduce or eliminate tumor lesion recurrence in treated patients. Additionally, intralesional administration of REGN2810 is expected to eliminate the need for surgery in the treated CSCC patients.

Figure 2B:
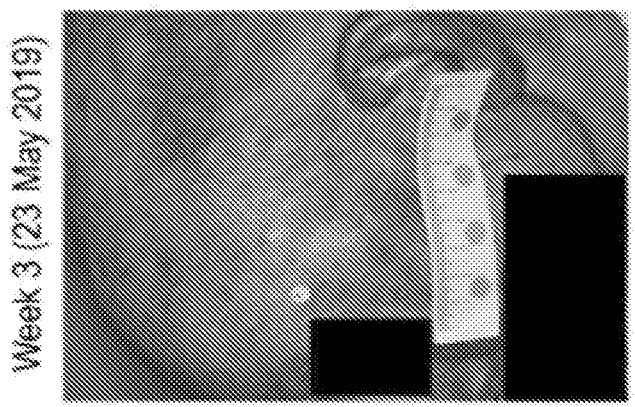
FIG. 2B shows a photo of the first exemplary patient after intralesional administration of the anti-PD-1 antibody cemiplimab.
Figure 2A:
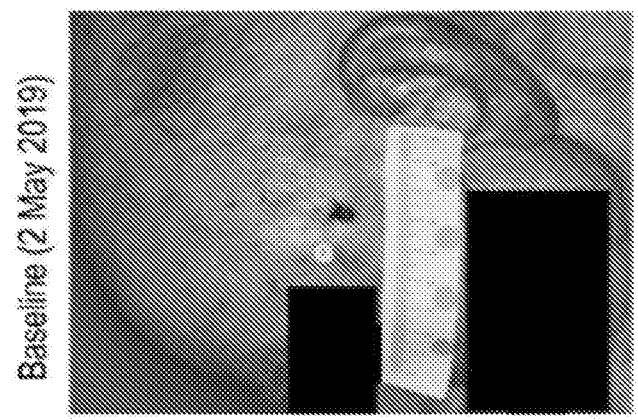
FIG. 2A shows a photo of a first exemplary patient with CSCC at baseline.
Figure 3B:
FIG. 3B shows a photo of the second exemplary patient after intralesional administration of the anti-PD-1 antibody cemiplimab.
Figure 3A:
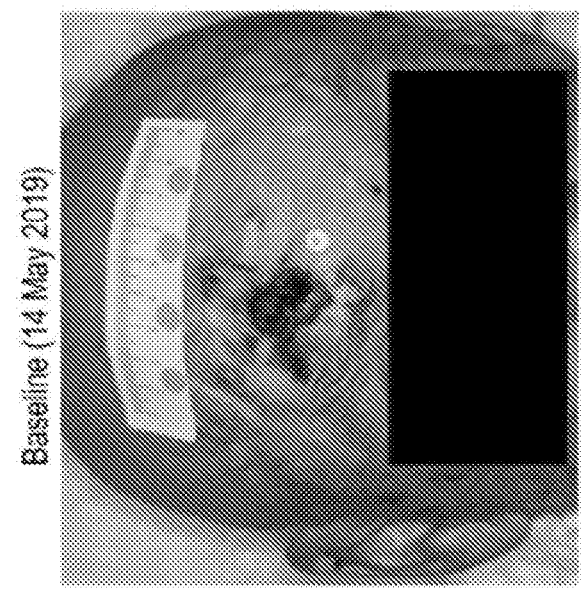
FIG. 3A shows a photo of a second exemplary patient with CSCC at baseline.

To date, patients have been enrolled at the first dose level (5 mg REGN2810 weekly). All the patients completed the DLT monitoring period without any DLTs. Results show tumor regression in patients with CSCC that were administered 5 mg cemiplimab intralesionally. FIGS. 2 and 3 show photos of two exemplary patients who showed tumor shrinkage upon intralesional administration of cemiplimab. Enrollment at other dose levels is on-going.

We claim:

1. A method of treating or inhibiting the growth of a tumor, comprising:
   (a) selecting a patient with a skin cancer; and
   (b) intralesionally administering to the tumor of the patient one or more doses of a pharmaceutical composition comprising a therapeutically effective amount of a programmed death 1 (PD-1) inhibitor, wherein the PD-1 inhibitor is an antibody or antigen-binding fragment thereof that specifically binds PD-1 and comprises three complementarity determining regions (CDRs) (HCDR1, HCDR2, and HCDR3) of a heavy chain variable region (HCVR) comprising the amino acid sequence of SEQ ID NO: 1 and three CDRs (LCDR1, LCDR2, and LCDR3) of a light chain variable region (LCVR) comprising the amino acid sequence of SEQ ID NO: 2 wherein the skin cancer is cutaneous squamous cell carcinoma (CSCC) or basal cell carcinoma (BCC).

2. The method according to claim 1, wherein the skin cancer is CSCC.

3. The method according to claim 1, wherein the skin cancer is recurrent resectable CSCC.

4. The method according to claim 1, wherein the patient has had prior treatment for the cancer.

5. The method according to claim 4, wherein the prior treatment comprises surgery, radiation, chemotherapy, treatment with a PD-1 inhibitor, and/or other anti-tumor therapy.

6. The method according to claim 1, wherein the patient is at risk of recurrence.

7. The method according to claim 1, wherein the patient has a prior history of recurrence after surgery.

8. The method according to claim 1, wherein each dose of the PD-1 inhibitor comprises one or more intralesional injections of the pharmaceutical composition into the tumor.

9. The method according to claim 8, wherein at least two intralesional injections are administered into different locations of the tumor.

10. The method according to claim 8, wherein two to five intralesional injections are administered into two to five locations of the tumor.

11. The method according to claim 8, wherein at least one intralesional injection is administered into the upper half of the tumor.

12. The method according to claim 8, wherein at least one intralesional injection is administered into skin overlying the tumor.

13. The method according to claim 8, wherein at least one intralesional injection is administered into a superior periphery of the tumor, adjacent an interface with normal-appearing skin.

14. The method according to claim 1, wherein the tumor has a surface diameter of at least 1 cm.

15. The method according to claim 1, wherein the tumor has a surface diameter of no more than 2 cm.

16. The method according to claim 1, wherein each dose is administered once a day, once in two days, once in three days, once in four days, once in five days, once in six days, once a week or twice a week.

17. The method according to claim 1, wherein each dose comprises 5 mg to 200 mg of the PD-1 inhibitor.

18. The method according to claim 1, wherein each dose comprises 5 mg, 15 mg, or 44 mg of the PD-1 inhibitor.

19. The method according to claim 1, wherein the administration of the PD-1 inhibitor promotes tumor regression, reduces tumor cell load, reduces tumor burden, and/or prevents tumor recurrence in the patient.

20. The method according to claim 1, wherein the intralesional administration of the PD-1 inhibitor promotes at least about 10% more tumor regression than intravenous administration of the PD-1 inhibitor.

21. The method according to claim 1, wherein the intralesional administration of the PD-1 inhibitor leads to lower incidence of adverse events, less severity of adverse events, and/or less toxicity than intravenous administration of the PD-1 inhibitor.

22. The method according to claim 1, further comprising surgically removing the tumor after step (b).

23. The method according to claim 1, further comprising administering a second therapeutic agent or therapy selected from surgery, radiation, chemotherapy, a corticosteroid, an anti-inflammatory drug, and/or combinations thereof.

24. The method of claim 23, wherein the PD-1 inhibitor is administered before a second therapeutic agent or therapy.

25. The method of claim 23, wherein the PD-1 inhibitor is administered after a second therapeutic agent or therapy.

26. The method according to claim 1, wherein: HCDR1 has an amino acid sequence of SEQ ID NO: 3; HCDR2 has an amino acid sequence of SEQ ID NO: 4; HCDR3 has an amino acid sequence of SEQ ID NO: 5; LCDR1 has an amino acid sequence of SEQ ID NO: 6; LCDR2 has an amino acid sequence of SEQ ID NO: 7; and LCDR3 has an amino acid sequence of SEQ ID NO: 8.

27. The method according to claim 26, wherein the anti-PD-1 antibody or antigen-binding fragment thereof comprises a HCVR/LCVR sequence pair of SEQ ID NOs: 1/2.

28. The method according to claim 27, wherein the anti-PD-1 antibody comprises a heavy chain and a light chain, wherein the heavy chain has an amino acid sequence of SEQ ID NO: 9.

29. The method according to claim 27, wherein the anti-PD-1 antibody comprises a heavy chain and a light chain, wherein the light chain has an amino acid sequence of SEQ ID NO: 10.

30. The method according to claim 27, wherein the anti-PD-1 antibody comprises a heavy chain and a light chain, wherein the heavy chain has an amino acid sequence of SEQ ID NO: 9 and the light chain has an amino acid sequence of SEQ ID NO: 10.

31. The method according to claim 1, wherein the PD-1 inhibitor is cemiplimab or a bioequivalent thereof.

* * * * *

SEQUENCE LISTING

<160> NUMBER OF SEQ ID NOS: 10

<210> SEQ ID NO 1
<211> LENGTH: 117
<212> TYPE: PRT
<213> ORGANISM: Artificial Sequence
<220> FEATURE:
<223> OTHER INFORMATION: R2810 HCVR

<400> SEQUENCE: 1

```
Glu Val Gln Leu Leu Glu Ser Gly Gly Val Leu Val Gln Pro Gly Gly
1               5                   10                  15

Ser Leu Arg Leu Ser Cys Ala Ala Ser Gly Phe Thr Phe Ser Asn Phe
            20                  25                  30

Gly Met Thr Trp Val Arg Gln Ala Pro Gly Lys Gly Leu Glu Trp Val
        35                  40                  45

Ser Gly Ile Ser Gly Gly Gly Arg Asp Thr Tyr Phe Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Lys Gly Glu Asp Thr Ala Val Tyr Tyr Cys
                85                  90                  95

Val Lys Trp Gly Asn Ile Tyr Phe Asp Tyr Trp Gly Gln Gly Thr Leu
            100                 105                 110

Val Thr Val Ser Ser
        115

<210> SEQ ID NO 2
<211> LENGTH: 107
<212> TYPE: PRT
<213> ORGANISM: Artificial Sequence
<220> FEATURE:
<223> OTHER INFORMATION: R2810 LCVR

<400> SEQUENCE: 2

Asp Ile Gln Met Thr Gln Ser Pro Ser Ser Leu Ser Ala Ser Val Gly
1               5                   10                  15

Asp Ser Ile Thr Ile Thr Cys Arg Ala Ser Leu Ser Ile Asn Thr Phe
            20                  25                  30

Leu Asn Trp Tyr Gln Gln Lys Pro Gly Lys Ala Pro Asn Leu Leu Ile
        35                  40                  45

Tyr Ala Ala Ser Ser Leu His Gly Gly Val Pro Ser Arg Phe Ser Gly
    50                  55                  60

Ser Gly Ser Gly Thr Asp Phe Thr Leu Thr Ile Arg Thr Leu Gln Pro
65                  70                  75                  80

Glu Asp Phe Ala Thr Tyr Tyr Cys Gln Gln Ser Ser Asn Thr Pro Phe
                85                  90                  95

Thr Phe Gly Pro Gly Thr Val Val Asp Phe Arg
            100                 105

<210> SEQ ID NO 3
<211> LENGTH: 8
<212> TYPE: PRT
<213> ORGANISM: Artificial Sequence
<220> FEATURE:
<223> OTHER INFORMATION: R2810 HCDR1

<400> SEQUENCE: 3

Gly Phe Thr Phe Ser Asn Phe Gly
1               5

<210> SEQ ID NO 4
<211> LENGTH: 8
<212> TYPE: PRT
<213> ORGANISM: Artificial Sequence
<220> FEATURE:
<223> OTHER INFORMATION: R2810 HCDR2

<400> SEQUENCE: 4
```

Ile Ser Gly Gly Gly Arg Asp Thr
1               5

<210> SEQ ID NO 5
<211> LENGTH: 10
<212> TYPE: PRT
<213> ORGANISM: Artificial Sequence
<220> FEATURE:
<223> OTHER INFORMATION: R2810 HCDR3

<400> SEQUENCE: 5

Val Lys Trp Gly Asn Ile Tyr Phe Asp Tyr
1               5                   10

<210> SEQ ID NO 6
<211> LENGTH: 6
<212> TYPE: PRT
<213> ORGANISM: Artificial Sequence
<220> FEATURE:
<223> OTHER INFORMATION: R2810 LCDR1

<400> SEQUENCE: 6

Leu Ser Ile Asn Thr Phe
1               5

<210> SEQ ID NO 7
<211> LENGTH: 3
<212> TYPE: PRT
<213> ORGANISM: Artificial Sequence
<220> FEATURE:
<223> OTHER INFORMATION: R2810 LCDR2

<400> SEQUENCE: 7

Ala Ala Ser
1

<210> SEQ ID NO 8
<211> LENGTH: 9
<212> TYPE: PRT
<213> ORGANISM: Artificial Sequence
<220> FEATURE:
<223> OTHER INFORMATION: R2810 LCDR3

<400> SEQUENCE: 8

Gln Gln Ser Ser Asn Thr Pro Phe Thr
1               5

<210> SEQ ID NO 9
<211> LENGTH: 444
<212> TYPE: PRT
<213> ORGANISM: Artificial Sequence
<220> FEATURE:
<223> OTHER INFORMATION: R2810 HC

<400> SEQUENCE: 9

Glu Val Gln Leu Leu Glu Ser Gly Gly Val Leu Val Gln Pro Gly Gly
1               5                   10                  15

Ser Leu Arg Leu Ser Cys Ala Ala Ser Gly Phe Thr Phe Ser Asn Phe
            20                  25                  30

Gly Met Thr Trp Val Arg Gln Ala Pro Gly Lys Gly Leu Glu Trp Val
        35                  40                  45

Ser Gly Ile Ser Gly Gly Gly Arg Asp Thr Tyr Phe Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Lys Gly Glu Asp Thr Ala Val Tyr Tyr Cys
                85                  90                  95

Val Lys Trp Gly Asn Ile Tyr Phe Asp Tyr Trp Gly Gln Gly Thr Leu
            100                 105                 110

Val Thr Val Ser Ser Ala Ser Thr Lys Gly Pro Ser Val Phe Pro Leu
            115                 120                 125

Ala Pro Cys Ser Arg Ser Thr Ser Glu Ser Thr Ala Ala Leu Gly Cys
        130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
                165                 170                 175

Ser Gly Leu Tyr Ser Leu Ser Ser Val Val Thr Val Pro Ser Ser Ser
            180                 185                 190

Leu Gly Thr Lys Thr Tyr Thr Cys Asn Val Asp His Lys Pro Ser Asn
        195                 200                 205

Thr Lys Val Asp Lys Arg Val Glu Ser Lys Tyr Gly Pro Pro Cys Pro
    210                 215                 220

Pro Cys Pro Ala Pro Glu Phe Leu Gly Gly Pro Ser Val Phe Leu Phe
225                 230                 235                 240

Pro Pro Lys Pro Lys Asp Thr Leu Met Ile Ser Arg Thr Pro Glu Val
                245                 250                 255

Thr Cys Val Val Val Asp Val Ser Gln Glu Asp Pro Glu Val Gln Phe
            260                 265                 270

Asn Trp Tyr Val Asp Gly Val Glu Val His Asn Ala Lys Thr Lys Pro
        275                 280                 285

Arg Glu Glu Gln Phe Asn Ser Thr Tyr Arg Val Val Ser Val Leu Thr
    290                 295                 300

Val Leu His Gln Asp Trp Leu Asn Gly Lys Glu Tyr Lys Cys Lys Val
305                 310                 315                 320

Ser Asn Lys Gly Leu Pro Ser Ser Ile Glu Lys Thr Ile Ser Lys Ala
                325                 330                 335

Lys Gly Gln Pro Arg Glu Pro Gln Val Tyr Thr Leu Pro Pro Ser Gln
            340                 345                 350

Glu Glu Met Thr Lys Asn Gln Val Ser Leu Thr Cys Leu Val Lys Gly
        355                 360                 365

Phe Tyr Pro Ser Asp Ile Ala Val Glu Trp Glu Ser Asn Gly Gln Pro
    370                 375                 380

Glu Asn Asn Tyr Lys Thr Thr Pro Pro Val Leu Asp Ser Asp Gly Ser
385                 390                 395                 400

Phe Phe Leu Tyr Ser Arg Leu Thr Val Asp Lys Ser Arg Trp Gln Glu
                405                 410                 415

Gly Asn Val Phe Ser Cys Ser Val Met His Glu Ala Leu His Asn His
            420                 425                 430

Tyr Thr Gln Lys Ser Leu Ser Leu Ser Leu Gly Lys
        435                 440

<210> SEQ ID NO 10
<211> LENGTH: 214
<212> TYPE: PRT
<213> ORGANISM: Artificial Sequence
<220> FEATURE:
<223> OTHER INFORMATION: R2810 LC

<400> SEQUENCE: 10

-continued

```
Asp Ile Gln Met Thr Gln Ser Pro Ser Ser Leu Ser Ala Ser Val Gly
1               5                  10                 15

Asp Ser Ile Thr Ile Thr Cys Arg Ala Ser Leu Ser Ile Asn Thr Phe
            20                  25                 30

Leu Asn Trp Tyr Gln Gln Lys Pro Gly Lys Ala Pro Asn Leu Leu Ile
        35                  40                  45

Tyr Ala Ala Ser Ser Leu His Gly Gly Val Pro Ser Arg Phe Ser Gly
    50                  55                  60

Ser Gly Ser Gly Thr Asp Phe Thr Leu Thr Ile Arg Thr Leu Gln Pro
65                  70                      75                 80

Glu Asp Phe Ala Thr Tyr Tyr Cys Gln Gln Ser Ser Asn Thr Pro Phe
                85                  90                  95

Thr Phe Gly Pro Gly Thr Val Val Asp Phe Arg Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
                180                 185                 190

Ala Cys Glu Val Thr His Gln Gly Leu Ser Ser Pro Val Thr Lys Ser
        195                 200                 205

Phe Asn Arg Gly Glu Cys
    210
```